(12) United States Patent  (10) Patent No.: US 7,297,471 B1
Miles  (45) Date of Patent: Nov. 20, 2007

(54) METHOD FOR MANUFACTURING AN ARRAY OF INTERFEROMETRIC MODULATORS

(75) Inventor: Mark W. Miles, San Francisco, CA (US)

(73) Assignee: IDC, LLC, San Francisco, CA (US)

( * ) Notice: Subject to any disclaimer, the term of this patent is extended or adjusted under 35 U.S.C. 154(b) by 18 days.

(21) Appl. No.: 10/414,594

(22) Filed: Apr. 15, 2003

(51) Int. Cl.
 *G03F 7/26* (2006.01)
(52) U.S. Cl. ....................................... 430/321; 430/311
(58) Field of Classification Search ................. 430/321
 See application file for complete search history.

(56) References Cited

U.S. PATENT DOCUMENTS

| | | | |
|---|---|---|---|
| 2,534,846 A | 12/1950 | Ambrose et al. | |
| 3,439,973 A | 4/1969 | Paul et al. | |
| 3,443,854 A | 5/1969 | Weiss | |
| 3,616,312 A | 10/1971 | McGriff et al. | |
| 3,653,741 A | 4/1972 | Marks | |
| 3,656,836 A | 4/1972 | de Cremoux et al. | |
| 3,725,868 A | 4/1973 | Malmer, Jr. et al. | |
| 3,813,265 A | 5/1974 | Marks | |
| 3,955,880 A | 5/1976 | Lierke | |
| 4,099,854 A | 7/1978 | Decker et al. | |
| 4,196,396 A | 4/1980 | Smith | |
| 4,228,437 A | 10/1980 | Shelton | |
| 4,377,324 A | 3/1983 | Durand et al. | |
| 4,389,096 A | 6/1983 | Hori et al. | |
| 4,392,711 A | 7/1983 | Moraw et al. | |
| 4,403,248 A | 9/1983 | te Velde | |

FOREIGN PATENT DOCUMENTS

DE  102 28 946 A  1/2004

(Continued)

OTHER PUBLICATIONS

Akasaka, "Three-Dimensional IC Trends", Proceedings of IEEE, vol. 74, No. 12, pp. 1703-1714, (Dec. 1986).

(Continued)

*Primary Examiner*—Kathleen Duda
(74) *Attorney, Agent, or Firm*—Knobbe Martens Olson & Bear LLP

(57) ABSTRACT

In one embodiment, the invention provides a method for manufacturing an array of interferometric modulators. Each interferometric modulator comprises first and second optical layers which when the interferometric modulator is in an undriven state are spaced by a gap of one size, and when the interferometric modulator is in a driven state are spaced by a gap of another size, the size of the gap determining an optical response of the interferometric modulator. The method comprises fabricating interferometric modulators of a first type characterized by the size of the gap between its first and second optical layers when in the undriven state; fabricating interferometric modulators of a second type characterized by the size of the gap between its first and second optical layers when in the undriven state; and fabricating interferometric modulators of a third type characterized by the size of the gap between its first and second optical layers when in the undriven state, wherein fabricating the interferometric modulators of the first, second, and third types comprises using a sequence of deposition and patterning steps of not more than 9 masking steps to deposit and pattern layers of material on a substrate.

17 Claims, 20 Drawing Sheets

U.S. PATENT DOCUMENTS

| | | |
|---|---|---|
| 4,441,791 A | 4/1984 | Hornbeck |
| 4,445,050 A | 4/1984 | Marks |
| 4,459,182 A | 7/1984 | te Velde |
| 4,482,213 A | 11/1984 | Piliavin et al. |
| 4,500,171 A | 2/1985 | Penz et al. |
| 4,519,676 A | 5/1985 | te Velde |
| 4,531,126 A | 7/1985 | Sadones |
| 4,566,935 A | 1/1986 | Hornbeck |
| 4,571,603 A | 2/1986 | Hornbeck et al. |
| 4,596,992 A | 6/1986 | Hornbeck |
| 4,615,595 A | 10/1986 | Hornbeck |
| 4,617,608 A | 10/1986 | Blonder et al. |
| 4,662,746 A | 5/1987 | Hornbeck |
| 4,663,083 A | 5/1987 | Marks |
| 4,681,403 A | 7/1987 | te Velde et al. |
| 4,710,732 A | 12/1987 | Hornbeck |
| 4,748,366 A | 5/1988 | Taylor |
| 4,786,128 A | 11/1988 | Birnbach |
| 4,790,635 A | 12/1988 | Apsley |
| 4,856,863 A | 8/1989 | Sampsell et al. |
| 4,859,060 A | 8/1989 | Kitagiri et al. |
| 4,900,136 A | 2/1990 | Goldburt et al. |
| 4,900,395 A | 2/1990 | Syverson et al. |
| 4,937,496 A | 6/1990 | Neiger et al. |
| 4,954,789 A | 9/1990 | Sampsell |
| 4,956,619 A | 9/1990 | Hornbeck |
| 4,965,562 A | 10/1990 | Verhulst |
| 4,982,184 A | 1/1991 | Kirkwood |
| 5,018,256 A | 5/1991 | Hornbeck |
| 5,022,745 A | 6/1991 | Zahowski et al. |
| 5,028,939 A | 7/1991 | Hornbeck et al. |
| 5,034,351 A * | 7/1991 | Sun et al. .................. 438/202 |
| 5,037,173 A | 8/1991 | Sampsell et al. |
| 5,044,736 A | 9/1991 | Jaskie et al. |
| 5,061,049 A | 10/1991 | Hornbeck |
| 5,075,796 A | 12/1991 | Schildkraut et al. |
| 5,078,479 A | 1/1992 | Vuilleumier |
| 5,079,544 A | 1/1992 | DeMond et al. |
| 5,083,857 A | 1/1992 | Hornbeck |
| 5,096,279 A | 3/1992 | Hornbeck et al. |
| 5,099,353 A | 3/1992 | Hornbeck |
| 5,124,834 A | 6/1992 | Cusano et al. |
| 5,136,669 A | 8/1992 | Gerdt |
| 5,142,405 A | 8/1992 | Hornbeck |
| 5,142,414 A | 8/1992 | Koehler |
| 5,153,771 A | 10/1992 | Link et al. |
| 5,162,787 A | 11/1992 | Thompson et al. |
| 5,168,406 A | 12/1992 | Nelson |
| 5,170,156 A | 12/1992 | DeMond et al. |
| 5,172,262 A | 12/1992 | Hornbeck |
| 5,179,274 A | 1/1993 | Sampsell |
| 5,192,395 A | 3/1993 | Boysel et al. |
| 5,192,946 A | 3/1993 | Thompson et al. |
| 5,206,629 A | 4/1993 | DeMond et al. |
| 5,212,582 A | 5/1993 | Nelson |
| 5,214,419 A | 5/1993 | DeMond et al. |
| 5,214,420 A | 5/1993 | Thompson et al. |
| 5,216,537 A | 6/1993 | Hornbeck |
| 5,226,099 A | 7/1993 | Mignardi et al. |
| 5,228,013 A | 7/1993 | Bik |
| 5,231,532 A | 7/1993 | Magel et al. |
| 5,233,385 A | 8/1993 | Sampsell |
| 5,233,456 A | 8/1993 | Nelson |
| 5,233,459 A | 8/1993 | Bozler et al. |
| 5,254,980 A | 10/1993 | Hendrix et al. |
| 5,272,473 A | 12/1993 | Thompson et al. |
| 5,278,652 A | 1/1994 | Urbanus et al. |
| 5,280,277 A | 1/1994 | Hornbeck |
| 5,287,096 A | 2/1994 | Thompson et al. |
| 5,293,272 A | 3/1994 | Jannson et al. |
| 5,296,950 A | 3/1994 | Lin et al. |
| 5,299,041 A | 3/1994 | Morin et al. |
| 5,305,640 A | 4/1994 | Boysel et al. |
| 5,311,360 A | 5/1994 | Bloom et al. |
| 5,312,513 A | 5/1994 | Florence et al. |
| 5,323,002 A | 6/1994 | Sampsell et al. |
| 5,324,683 A | 6/1994 | Fitch et al. |
| 5,325,116 A | 6/1994 | Sampsell |
| 5,326,430 A | 7/1994 | Cronin et al. |
| 5,327,286 A | 7/1994 | Sampsell et al. |
| 5,330,617 A | 7/1994 | Haond |
| 5,331,454 A | 7/1994 | Hornbeck |
| 5,339,116 A | 8/1994 | Urbanus et al. |
| 5,345,328 A | 9/1994 | Fritz et al. |
| 5,347,377 A | 9/1994 | Revelli, Jr. et al. |
| 5,355,357 A | 10/1994 | Yamamori et al. |
| 5,358,601 A | 10/1994 | Cathey |
| 5,365,283 A | 11/1994 | Doherty et al. |
| 5,381,232 A | 1/1995 | van Wijk |
| 5,381,253 A | 1/1995 | Sharp et al. |
| 5,401,983 A | 3/1995 | Jokerst et al. |
| 5,411,769 A | 5/1995 | Hornbeck |
| 5,444,566 A | 8/1995 | Gale et al. |
| 5,446,479 A | 8/1995 | Thompson et al. |
| 5,448,314 A | 9/1995 | Heimbuch et al. |
| 5,452,024 A | 9/1995 | Sampsell |
| 5,454,906 A | 10/1995 | Baker et al. |
| 5,457,493 A | 10/1995 | Leddy et al. |
| 5,457,566 A | 10/1995 | Sampsell et al. |
| 5,459,602 A | 10/1995 | Sampsell |
| 5,459,610 A | 10/1995 | Bloom et al. |
| 5,461,411 A | 10/1995 | Florence et al. |
| 5,474,865 A | 12/1995 | Vasudev |
| 5,489,952 A | 2/1996 | Gove et al. |
| 5,497,172 A | 3/1996 | Doherty et al. |
| 5,497,197 A | 3/1996 | Gove et al. |
| 5,499,037 A | 3/1996 | Nakagawa et al. |
| 5,499,062 A | 3/1996 | Urbanus |
| 5,500,635 A | 3/1996 | Mott |
| 5,500,761 A | 3/1996 | Goossen et al. |
| 5,503,952 A | 4/1996 | Suzuki et al. |
| 5,506,597 A | 4/1996 | Thompson et al. |
| 5,515,076 A | 5/1996 | Thompson et al. |
| 5,517,347 A | 5/1996 | Sampsell |
| 5,523,803 A | 6/1996 | Urbanus et al. |
| 5,526,051 A | 6/1996 | Gove et al. |
| 5,526,172 A | 6/1996 | Kanack |
| 5,526,327 A | 6/1996 | Cordova, Jr. |
| 5,526,688 A | 6/1996 | Boysel et al. |
| 5,535,047 A | 7/1996 | Hornbeck |
| 5,548,301 A | 8/1996 | Kornher et al. |
| 5,551,293 A | 9/1996 | Boysel et al. |
| 5,552,924 A | 9/1996 | Tregilgas |
| 5,552,925 A | 9/1996 | Worley |
| 5,559,358 A | 9/1996 | Burns et al. |
| 5,563,398 A | 10/1996 | Sampsell |
| 5,567,334 A | 10/1996 | Baker et al. |
| 5,570,135 A | 10/1996 | Gove et al. |
| 5,579,149 A | 11/1996 | Moret et al. |
| 5,581,272 A | 12/1996 | Conner et al. |
| 5,583,688 A | 12/1996 | Hornbeck |
| 5,589,852 A | 12/1996 | Thompson et al. |
| 5,597,736 A | 1/1997 | Sampsell |
| 5,600,383 A | 2/1997 | Hornbeck |
| 5,602,671 A | 2/1997 | Hornbeck |
| 5,606,441 A | 2/1997 | Florence et al. |
| 5,608,468 A | 3/1997 | Gove et al. |
| 5,610,438 A | 3/1997 | Wallace et al. |
| 5,610,624 A | 3/1997 | Bhuva |
| 5,610,625 A | 3/1997 | Sampsell |
| 5,619,059 A | 4/1997 | Li et al. |
| 5,619,365 A | 4/1997 | Rhoades et al. |
| 5,619,366 A | 4/1997 | Rhoads et al. |
| 5,622,814 A | 4/1997 | Miyata et al. |

| | | |
|---|---|---|
| 5,629,790 A | 5/1997 | Neukermans et al. |
| 5,633,652 A | 5/1997 | Kanbe et al. |
| 5,636,052 A | 6/1997 | Arney et al. |
| 5,636,185 A | 6/1997 | Brewer et al. |
| 5,638,084 A | 6/1997 | Kalt |
| 5,638,946 A | 6/1997 | Zavracky |
| 5,641,391 A | 6/1997 | Hunter et al. |
| 5,646,768 A | 7/1997 | Kaeiyama |
| 5,647,819 A | 7/1997 | Fujita et al. |
| 5,650,834 A | 7/1997 | Nakagawa et al. |
| 5,650,881 A | 7/1997 | Hornbeck |
| 5,654,741 A | 8/1997 | Sampsell et al. |
| 5,657,099 A | 8/1997 | Doherty et al. |
| 5,659,374 A | 8/1997 | Gale, Jr. et al. |
| 5,665,997 A | 9/1997 | Weaver et al. |
| 5,673,139 A | 9/1997 | Johnson |
| 5,674,757 A | 10/1997 | Kim |
| 5,683,591 A | 11/1997 | Offenberg |
| 5,703,710 A | 12/1997 | Brinkman et al. |
| 5,706,022 A | 1/1998 | Hato |
| 5,710,656 A | 1/1998 | Goosen |
| 5,726,480 A | 3/1998 | Pister |
| 5,739,945 A | 4/1998 | Tayebati |
| 5,745,193 A | 4/1998 | Urbanus et al. |
| 5,745,281 A | 4/1998 | Yi et al. |
| 5,771,116 A | 6/1998 | Miller et al. |
| 5,784,190 A | 7/1998 | Worley |
| 5,784,212 A | 7/1998 | Hornbeck |
| 5,793,504 A | 8/1998 | Stoll |
| 5,808,780 A | 9/1998 | McDonald |
| 5,818,095 A | 10/1998 | Sampsell |
| 5,822,170 A | 10/1998 | Cabuz et al. |
| 5,824,608 A | 10/1998 | Gotoh et al. |
| 5,825,528 A | 10/1998 | Goossen |
| 5,835,255 A | 11/1998 | Miles |
| 5,838,484 A | 11/1998 | Goosen et al. |
| 5,842,088 A | 11/1998 | Thompson |
| 5,867,302 A | 2/1999 | Fleming et al. |
| 5,912,758 A | 6/1999 | Knipe et al. |
| 5,943,158 A | 8/1999 | Ford et al. |
| 5,959,763 A | 9/1999 | Bozler et al. |
| 5,972,193 A | 10/1999 | Chou et al. |
| 5,976,902 A | 11/1999 | Shih |
| 5,986,796 A | 11/1999 | Miles |
| 6,016,693 A | 1/2000 | Viani et al. |
| 6,028,690 A | 2/2000 | Carter et al. |
| 6,038,056 A | 3/2000 | Florence et al. |
| 6,040,937 A | 3/2000 | Miles |
| 6,049,317 A | 4/2000 | Thompson et al. |
| 6,055,090 A | 4/2000 | Miles |
| 6,057,903 A | 5/2000 | Colgan et al. |
| 6,061,075 A | 5/2000 | Nelson et al. |
| 6,099,132 A | 8/2000 | Kaeiyama |
| 6,100,872 A | 8/2000 | Aratani et al. |
| 6,113,239 A | 9/2000 | Sampsell et al. |
| 6,115,326 A | 9/2000 | Puma et al. |
| 6,147,790 A | 11/2000 | Meier et al. |
| 6,158,156 A | 12/2000 | Patrick |
| 6,160,833 A | 12/2000 | Floyd et al. |
| 6,166,422 A | 12/2000 | Qian et al. |
| 6,180,428 B1 | 1/2001 | Peeters et al. |
| 6,194,323 B1 | 2/2001 | Downey et al. |
| 6,195,196 B1 | 2/2001 | Kimura et al. |
| 6,201,633 B1 | 3/2001 | Peeters et al. |
| 6,204,080 B1 | 3/2001 | Hwang |
| 6,232,936 B1 | 5/2001 | Gove et al. |
| 6,243,149 B1 | 6/2001 | Swanson et al. |
| 6,246,398 B1 | 6/2001 | Koo |
| 6,249,039 B1 | 6/2001 | Harvey et al. |
| 6,282,010 B1 | 8/2001 | Sulzbach et al. |
| 6,284,560 B1 | 9/2001 | Jech et al. |
| 6,295,154 B1 | 9/2001 | Laor et al. |
| 6,323,982 B1 | 11/2001 | Hornbeck |
| 6,327,071 B1 | 12/2001 | Kimura et al. |
| 6,329,297 B1 | 12/2001 | Balish et al. |
| 6,335,831 B2 | 1/2002 | Kowarz et al. |
| 6,351,329 B1 | 2/2002 | Greywall |
| 6,356,254 B1 | 3/2002 | Kimura |
| 6,376,787 B1 | 4/2002 | Martin et al. |
| 6,391,675 B1 | 5/2002 | Ehmke et al. |
| 6,392,233 B1 | 5/2002 | Channin et al. |
| 6,392,781 B1 | 5/2002 | Kim et al. |
| 6,407,851 B1 | 6/2002 | Islam et al. |
| 6,447,126 B1 | 9/2002 | Hornbeck |
| 6,452,465 B1 | 9/2002 | Brown et al. |
| 6,456,420 B1 | 9/2002 | Goodwin-Johansson |
| 6,465,355 B1 | 10/2002 | Horsley |
| 6,466,354 B1 | 10/2002 | Gudeman |
| 6,466,358 B2 | 10/2002 | Tew |
| 6,473,274 B1 | 10/2002 | Maimone et al. |
| 6,480,177 B2 | 11/2002 | Doherty et al. |
| 6,513,911 B1 | 2/2003 | Ozaki et al. |
| 6,522,801 B1 | 2/2003 | Aksyuk et al. |
| 6,531,945 B1 | 3/2003 | Ahn et al. |
| 6,537,427 B1 | 3/2003 | Raina et al. |
| 6,545,335 B1 | 4/2003 | Chua et al. |
| 6,548,908 B2 | 4/2003 | Chua et al. |
| 6,549,338 B1 | 4/2003 | Wolverton et al. |
| 6,552,840 B2 | 4/2003 | Knipe |
| 6,574,033 B1 | 6/2003 | Chui et al. |
| 6,577,785 B1 | 6/2003 | Spahn et al. |
| 6,589,625 B1 | 7/2003 | Kothari et al. |
| 6,600,201 B2 | 7/2003 | Hartwell et al. |
| 6,606,175 B1 | 8/2003 | Sampsell et al. |
| 6,608,268 B1 | 8/2003 | Goldsmith |
| 6,610,440 B1 | 8/2003 | LaFollette et al. |
| 6,625,047 B2 | 9/2003 | Coleman, Jr. |
| 6,630,786 B2 | 10/2003 | Cummings et al. |
| 6,632,698 B2 | 10/2003 | Ives |
| 6,635,919 B1 | 10/2003 | Melendez et al. |
| 6,642,913 B1 | 11/2003 | Kimura et al. |
| 6,643,069 B2 | 11/2003 | Dewald |
| 6,650,455 B2 | 11/2003 | Miles et al. |
| 6,657,832 B2 | 12/2003 | Williams et al. |
| 6,666,561 B1 | 12/2003 | Blakley |
| 6,674,033 B1 | 1/2004 | Chui et al. |
| 6,674,562 B1 | 1/2004 | Miles |
| 6,680,792 B2 | 1/2004 | Miles |
| 6,687,896 B1 | 2/2004 | Royce et al. |
| 6,710,908 B2 | 3/2004 | Miles et al. |
| 6,720,267 B1 | 4/2004 | Chen et al. |
| 6,736,987 B1 | 5/2004 | Cho |
| 6,741,377 B2 | 5/2004 | Miles |
| 6,741,384 B1 | 5/2004 | Martin et al. |
| 6,741,503 B1 | 5/2004 | Farris et al. |
| 6,743,570 B2 | 6/2004 | Harnett et al. |
| 6,747,785 B2 | 6/2004 | Chen et al. |
| 6,747,800 B1 | 6/2004 | Lin |
| 6,756,317 B2 | 6/2004 | Sniegowski et al. |
| 6,768,097 B1 | 7/2004 | Viktorovitch et al. |
| 6,775,174 B2 | 8/2004 | Huffman et al. |
| 6,778,155 B2 | 8/2004 | Doherty et al. |
| 6,778,306 B2 | 8/2004 | Sniegowski et al. |
| 6,794,119 B2 | 9/2004 | Miles |
| 6,811,267 B1 | 11/2004 | Allen et al. |
| 6,812,482 B2 | 11/2004 | Fleming et al. |
| 6,819,469 B1 | 11/2004 | Koba |
| 6,822,628 B2 | 11/2004 | Dunphy et al. |
| 6,829,132 B2 | 12/2004 | Martin et al. |
| 6,853,129 B1 | 2/2005 | Cummings et al. |
| 6,855,610 B2 | 2/2005 | Tung et al. |
| 6,859,218 B1 | 2/2005 | Luman et al. |
| 6,861,277 B1 | 3/2005 | Monroe et al. |
| 6,862,022 B2 | 3/2005 | Slupe |
| 6,862,029 B1 | 3/2005 | D'Souza et al. |
| 6,867,896 B2 | 3/2005 | Miles |

| | | | | | | |
|---|---|---|---|---|---|---|
| 6,870,581 B2 | 3/2005 | Li et al. | | 2004/0212026 A1 | 10/2004 | Van Brocklin et al. |
| 6,870,654 B2 | 3/2005 | Lin et al. | | 2004/0217378 A1 | 11/2004 | Martin et al. |
| 6,882,458 B2 | 4/2005 | Lin et al. | | 2004/0217919 A1 | 11/2004 | Pichl et al. |
| 6,882,461 B1 | 4/2005 | Tsai et al. | | 2004/0218251 A1 | 11/2004 | Piehl et al. |
| 6,905,621 B2 | 6/2005 | Ho et al. | | 2004/0218334 A1 | 11/2004 | Martin et al. |
| 6,912,022 B2 | 6/2005 | Lin et al. | | 2004/0218341 A1 | 11/2004 | Martin et al. |
| 6,952,303 B2 | 10/2005 | Lin et al. | | 2004/0227493 A1 | 11/2004 | Van Brocklin et al. |
| 6,952,304 B2 | 10/2005 | Mushika et al. | | 2004/0240027 A1 | 12/2004 | Lin et al. |
| 6,958,847 B2 | 10/2005 | Lin | | 2004/0240032 A1 | 12/2004 | Miles |
| 2001/0003487 A1 | 6/2001 | Miles | | 2004/0240138 A1 | 12/2004 | Martin et al. |
| 2001/0026951 A1 | 10/2001 | Vergani et al. | | 2004/0245588 A1 | 12/2004 | Nikkel et al. |
| 2001/0040649 A1 | 11/2001 | Ozaki | | 2004/0263944 A1 | 12/2004 | Miles et al. |
| 2001/0040675 A1 | 11/2001 | True et al. | | 2005/0001828 A1 | 1/2005 | Martin et al. |
| 2002/0015215 A1 | 2/2002 | Miles | | 2005/0003667 A1 | 1/2005 | Lin et al. |
| 2002/0021485 A1 | 2/2002 | Pilossof | | 2005/0020089 A1 | 1/2005 | Shi et al. |
| 2002/0024711 A1 | 2/2002 | Miles | | 2005/0024557 A1 | 2/2005 | Lin |
| 2002/0036304 A1 | 3/2002 | Ehmke et al. | | 2005/0035699 A1 | 2/2005 | Tsai |
| 2002/0054424 A1 | 5/2002 | Miles | | 2005/0036095 A1 | 2/2005 | Yeh et al. |
| 2002/0055253 A1 | 5/2002 | Rudhard | | 2005/0036192 A1 | 2/2005 | Lin et al. |
| 2002/0071169 A1 | 6/2002 | Bowers et al. | | 2005/0038950 A1 | 2/2005 | Adelmann |
| 2002/0075555 A1 | 6/2002 | Miles | | 2005/0042117 A1 | 2/2005 | Lin |
| 2002/0086455 A1 | 7/2002 | Franosch et al. | | 2005/0046922 A1 | 3/2005 | Lin et al. |
| 2002/0126364 A1 | 9/2002 | Miles | | 2005/0046948 A1 | 3/2005 | Lin |
| 2002/0135857 A1 | 9/2002 | Fitzpatrick et al. | | 2005/0057442 A1 | 3/2005 | Way |
| 2002/0137072 A1 | 9/2002 | Mirkin et al. | | 2005/0068583 A1 | 3/2005 | Gutkowski et al. |
| 2002/0149828 A1 | 10/2002 | Miles | | 2005/0068605 A1 | 3/2005 | Tsai |
| 2002/0168136 A1 | 11/2002 | Atia et al. | | 2005/0068606 A1 | 3/2005 | Tsai |
| 2003/0006468 A1 | 1/2003 | Ma et al. | | 2005/0069209 A1 | 3/2005 | Damera-Venkata et al. |
| 2003/0043157 A1 | 3/2003 | Miles | | 2005/0078348 A1 | 4/2005 | Lin |
| 2003/0054588 A1 | 3/2003 | Patel et al. | | 2005/0168849 A1 | 8/2005 | Lin |
| 2003/0062186 A1 | 4/2003 | Boroson et al. | | 2005/0195462 A1 | 9/2005 | Lin |
| 2003/0072070 A1 | 4/2003 | Miles | | 2005/0195467 A1 | 9/2005 | Kothari et al. |
| 2003/0090350 A1 | 5/2003 | Feng et al. | | 2005/0202649 A1 | 9/2005 | Hung et al. |
| 2003/0112096 A1 | 6/2003 | Potter | | 2006/0066932 A1 | 3/2006 | Chui |
| 2003/0138213 A1 | 7/2003 | Jin et al. | | | | |
| 2003/0152872 A1 | 8/2003 | Miles | | FOREIGN PATENT DOCUMENTS | | |
| 2003/0201784 A1 | 10/2003 | Potter | | EP | 0 667 548 A1 | 8/1995 |
| 2003/0202264 A1 | 10/2003 | Weber et al. | | EP | 0694801 A | 1/1996 |
| 2003/0202265 A1 | 10/2003 | Reboa et al. | | EP | 0 695 959 | 2/1996 |
| 2003/0202266 A1 | 10/2003 | Ring et al. | | EP | 0878824 A2 | 11/1998 |
| 2003/0231373 A1 | 12/2003 | Kowarz et al. | | EP | 1 197 778 | 4/2002 |
| 2004/0010115 A1 | 1/2004 | Sotzing | | EP | 1258860 A1 | 11/2002 |
| 2004/0027636 A1 | 2/2004 | Miles | | EP | 1 452 481 A | 9/2004 |
| 2004/0027701 A1 | 2/2004 | Ishikawa | | JP | 157313 | 5/1991 |
| 2004/0028849 A1 | 2/2004 | Stark et al. | | JP | 40 5275401 A | 10/1993 |
| 2004/0035821 A1 | 2/2004 | Doan et al. | | JP | 05275401 A1 | 10/1993 |
| 2004/0051929 A1 | 3/2004 | Sampsell et al. | | JP | 10500224 | 1/1998 |
| 2004/0053434 A1 | 3/2004 | Bruner | | JP | 10-148644 | 6/1998 |
| 2004/0058531 A1 | 3/2004 | Miles et al. | | JP | 10-267658 | 10/1998 |
| 2004/0058532 A1 | 3/2004 | Miles et al. | | JP | 11211999 A | 8/1999 |
| 2004/0061543 A1 | 4/2004 | Nam et al. | | JP | 11243214 | 9/1999 |
| 2004/0063322 A1 | 4/2004 | Yang | | JP | 2000-40831 A | 2/2000 |
| 2004/0080807 A1 | 4/2004 | Chen et al. | | JP | 2002 062493 | 2/2002 |
| 2004/0080832 A1 | 4/2004 | Singh | | JP | 2002-270575 | 9/2002 |
| 2004/0087086 A1 | 5/2004 | Lee | | JP | 2002-355800 | 12/2002 |
| 2004/0100677 A1 | 5/2004 | Huibers et al. | | JP | 2003 001598 A | 1/2003 |
| 2004/0124073 A1 | 7/2004 | Pilans et al. | | JP | 2004-102022 | 4/2004 |
| 2004/0125281 A1 | 7/2004 | Lin et al. | | JP | 2004 106074 A | 4/2004 |
| 2004/0125282 A1 | 7/2004 | Lin et al. | | JP | 2004-212656 | 7/2004 |
| 2004/0125536 A1 | 7/2004 | Arney et al. | | JP | 2005 051007 A | 2/2005 |
| 2004/0136076 A1 | 7/2004 | Tayebati | | KR | 2000-0033006 | 6/2000 |
| 2004/0145049 A1 | 7/2004 | McKinnell et al. | | WO | WO92/10925 | 6/1992 |
| 2004/0145811 A1 | 7/2004 | Lin et al. | | WO | WO9530924 | 11/1995 |
| 2004/0147056 A1 | 7/2004 | McKinnell et al. | | WO | WO9717628 | 5/1997 |
| 2004/0147198 A1 | 7/2004 | Lin et al. | | WO | WO9952006 A2 | 10/1999 |
| 2004/0148009 A1 | 7/2004 | Buzzard | | WO | WO9952006 A3 | 10/1999 |
| 2004/0150869 A1 | 8/2004 | Kasai | | WO | WO0114248 | 3/2001 |
| 2004/0150915 A1* | 8/2004 | Thomas et al. .......... 360/235.8 | | WO | WO 02/24570 | 3/2002 |
| 2004/0160143 A1 | 8/2004 | Shreeve et al. | | WO | WO03007049 A1 | 1/2003 |
| 2004/0174583 A1 | 9/2004 | Chen et al. | | WO | WO 03/052506 | 6/2003 |
| 2004/0175577 A1 | 9/2004 | Lin et al. | | WO | WO03069413 A1 | 8/2003 |
| 2004/0179281 A1 | 9/2004 | Reboa | | WO | WO03073151 A1 | 9/2003 |
| 2004/0191937 A1 | 9/2004 | Patel et al. | | | | |

| WO | WO04006003 A1 | 1/2004 |
| WO | WO04026757 A2 | 4/2004 |
| WO | WO 2005/019899 A1 | 3/2005 |
| WO | WO 2005/085932 A | 9/2005 |
| WO | WO 2006/036385 | 4/2006 |
| WO | WO 2006/036437 | 4/2006 |
| WO | WO 2006/036542 | 4/2006 |

OTHER PUBLICATIONS

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).
Aratani K., et al., "Surface micromachined tuneable interferometer array," Sensors and Actuators, pp. 17-23. (1994).
Conner, "Hybrid Color Display Using Optical Interference Filter Array," SID Digest, pp. 577-580 (1993).
Fan et al., "Channel Drop Filters in Photonic Crystals," Optics Express, vol. 3, No. 1 (1998).
Giles et al., "A Silicon MEMS Optical Switch Attenuator and Its Use in Lightwave Subsystems," IEEE Journal of Selected Topics in Quanum Electronics, vol. 5, No. 1, pp. 18-25, (Jan./Feb. 1999).
Goossen et al., "Possible Display Applications of the Silicon Mechanical Anti-Reflection Switch," Society for Information Display (1994).
Goossen et al., "Silicon Modulator Based on Mechanically-Active Anti-Reflection Layer with 1Mbit/sec Capability for Fiber-in-the-Loop Applications," IEEE Photonics Technology Letters, pp. 1119-1121 (Sep. 1994).
Gosch, "West Germany Grabs the Lead in X-Ray Lithography," Electronics pp. 78-80 (Feb. 5, 1987).
Howard et al., "Nanometer-Scale Fabrication Techniques", VLSI Electronics: Microstructure Science, vol. 5, pp. 145-153 and pp. 166-173 (1982).
Ibbotson et al., "Comparison of XeF2 and F-atom reactions with Si and SiO2," Applied Physics Letters, vol. 44, No. 12, pp. 1129-1131 (Jun. 1984).
Jackson "Classical Electrodynamics", John Wiley & Sons Inc., pp. 568-573. date unknown.
Jerman et al., "A Miniature Fabry-Perot Interferometer with a Corrugated Silicon Diaphragm Support", (1988).
Joannopoulos et al., "Photonic Crystals: Molding the Flow of Light," Princeton University Press (1995).
Johnson "Optical Scanners", Microwave Scanning Antennas, vol. 1, p. 251-261, (1964).
Kim et al., "Control of Optical Transmission Through Metals Perforated With Subwavelength Hole Arrays," Optic Letters, vol. 24, No. 4, pp. 256-257, (Feb. 1999).
Light over Matter, Circle No. 36 (Jun. 1993).
Lin et al., "Free-Space Micromachined Optical Switched for Optical Networking," IEEE Journal of Selected Topics in Quantum Electronics, vol. 5, No. 1, pp. 4-9. (Jan./Feb. 1999).
Little et al., "Vertically Coupled Microring Resonator Channel Dropping Filter," IEEE Photonics Technology Letters, vol. 11, No. 2, (1999).
Magel, "Integrated Opic Devices Using Micromachined Metal Membranes," SPIE vol. 2686, 0-8194-2060-Mar. 1996.
Miles, Mark, W., "A New Reflective FPD Technology Using Interferometric Modulation", The Proceedings of the Society for Information Display (May 11-16, 1997).
Nagami et al., "Plastic Cell Architecture: Towards Reconfigurable Computing For General-Purpose," IEEE, 0-8186-8900-, pp. 68-77, (May 1998).
Newsbreaks, "Quantum-trench devices might operate at terahertz frequencies", Laser Focus World (May 1993).
Oliner et al., "Radiating Elements and Mutual Coupling", Microwave Scanning Antennas, vol. 2, pp. 131-141, (1966).
Raley et al., "A Fabry-Perot Microinterferometer for Visible Wavelengths", IEEE Solid-State Sensor and Actuator Workshop, Jun. 1992, Hilton Head, SC.

Schnakenberg et al., "TMAHW Etchants for Silicon Micromachining," 1991 International Conference on Solid State Sensors and Actuators-Digest of Technical Papers, pp. 815-818 (1991).
Sperger et al., "High Performance Patterned All-Dielectric Interference Colour Filter for Display Applications", SID Digest, pp. 81-83, (1994).
Sridharan et al., "Post-Packaging Release a New Concept for Surface-Micromachines Devices" Technical Digest, IEEE Solid-State Sensor & Actuator Workshop, New York, NY, US, Nov. 8, 1998, pp. 225-228, XP000992464.
Stone, "Radiation and Optics, An Introduction to the Classical Theory", McGraw-Hill, pp. 340-343, (1963).
Walker, et al., "Electron-beam-tunable Interference Filter Spatial Light Modulator", Optics Letters vol. 13, No. 5, pp. 345-347, (May 1988).
Williams et al., "Etch Rates for Micromachining Processing," Journal of Microelectromechanical Systems, vol. 5, No. 4, pp. 256-259 (Dec. 1996).
Winters et al., "The etching of silicon with XeF2 vapor. Applied Physics Letters," vol. 34, No. 1, pp. 70-73 (Jan. 1979).
Winton, John M., "A novel way to capture solar energy", Chemical Week, (May 1985).
Wu, "Design of a Reflective Color LCD Using Optical Interference Reflectors", ASIA Display '95, pp. 929-931, (Oct. 1995).
Zhou et al., "Waveguide Panel Display Using Electromechanical Spatial Modulators" SID Digest, vol. XXIX, (1998).
PCT/US02/13442, Search Report Sep. 13, 2002.
PCT/US04/20330 Search Report Nov. 8, 2004.
PCT/US2004/035820 International Search Report and Written Opinion (Nov. 4, 2005).
PCT/US96/17731 Search Report.
Aratani K. et al, "Process and Design Considerations for Survace Micromachined Beams for a Tuneable Interferometer Array in Silicon," Proceedings of the Workshop on Micro Electro Mechanical Systems (MEMS) Fort Lauderale, Feb. 7-10, 1993, New York, IEEE, US, vol. Workshop 6, Feb. 7, 1993, pp. 230-235.
Austrian Search Report dated Aug. 12, 2005.
Austrian Search Report dated Jul. 27, 2005.
Austrian Search Report dated Jul. 6, 2005.
Austrian Search Report dated May 13, 2005.
Austrian Search Report dated May 18, 2005.
Austrian Search Report dated May 4, 2005.
Chu et al., "Formation and Microstructures of Anodic Alumina Films from Aluminum Sputtered on Glass Substrate", Journal of the Electrochemical Society, 149 (7) B321-B327 (2002).
Crouse, "Self-ordered pore structure of anodized aluminum on silicon and pattern transfer", Applied Physics Letters, vol. 76, No. 1, Jan. 3, 2000, pp. 49-51.
EP 05255661.0 European Search Report (Dec. 30, 2005).
Furneaux, et al. "The formation of controlled-porosity membranes from anodically oxidized aluminum", Nature vol. 337 Jan. 12, 1989, pp. 147-149.
Goossen K.W., "MEMS-Based Variable Optical Interference Devices", Optical MEMS, 2000 IEEE/Leos International Conference on Aug. 21-24, 2000, Piscataway, NJ, USA, IEE, Aug. 21, 2000, pp. 17-18.
Harnett et al., "Heat-depolymerizable polycarbonates as electron beam patternable sacrificial layers for nanofluidics," J. Vac. Sci. Technol. B 19(6), (Nov./Dec. 2001), pp. 2842-2845.
International Search Report and Written Opinion PCT/US2005/033558 (Mailing Date: May 19, 2005).
International Search Report for application No. PCT/US2005/031237 (Mailing Date: Dec. 29, 2005).
Lee et al., "Electrostatic Actuation of Surface/Bulk Micromachined Single-Crystal Silicon Microresonators", International Conference on Intelligent Robots and Systems, vol. 2, pp. 1057-1062, (Oct. 17-21, 1999).
Lee et al., "The Surface/Bulk Micromachining (SBM) Process: A New Method for Fabricating Released MEMs in Single Crystal Silicon", Journal of Microelectromechanical Systems, vol. 8, Issue 4, pp. 409-416, (Dec. 1999).

Maboudian et al. "Critical Review: A dhesion in surface micromechanical structures", J. Vac. Sci. Techno. B 15(1), Jan./Feb. 1997, pp. 1-20.

PCT/US05/029821 International Search Report (Dec. 27, 2005).

PCT/US05/030927 International Search Report (Jan. 25, 2006).

PCT/US05/031693 International Search Report.

PCT/US05/032331 International Search Report (Apr. 7, 2006).

PCT/US05/033558 Partial International Search Report (Feb. 24, 2006).

Tayebi et al., "Reducing the effects of adhesion and friction in microelectromechanical systems (MEMSs) through surface roughening: Comparison Between theory and experiments", http://jap.aip.org/jap/copyright.jsp, Journal of Applied Physics 98, 073528 (2005).

Austrian Search Report for EX144/2005 dated Aug. 11, 2005.

Bains, "Digital Paper Display Technology Holds Promise For Portables," CommsDesign EE Times (2000).

Bass, Handbook of Optics, vol. 1, Fundamentals, Techniques, and Design, Second Edition, McGraw-Hill, inc. New York pp. 2.29/2.36 (1995).

French, P.J. "Development of Surface Micromachining techniques compatable with on-chip electronics" Journal of Micromechanics and Microengineering vol. 6 No. 2, 197-211 XP 002360789 Jun. 1996 IOP Publishing.

Jerman J. H. et al., "Maniature Fabry-Perot Interferometers Micromachined in Silicon for use in Optical Fiber WDM Systems," Transducers. San Francisco, Jun. 24-27, 1991, Proceedings of the Internatioal Conference on Solid State Sensors Andactuators, New Youk IEEE, US, vol. Conf. 6, Jun. 24, 1991.

Lieberman, "MEMS Display Looks to Give PDAs Sharper Image," EE Times (Feb. 11, 1997).

Liberman, "Microbridges at Heart of New MEMS Displays," EE Times (Apr. 24, 1997).

Microchem, LOR Lift-Off Resists Datasheet, 2002.

Miles, "Interferometric Modulation: MOEMS as an Enabling Technology for High-Performance Reflective Displays," Proceedings of the International Society for Optical Engineering, San Jose, CA, vol. 49085, pp. 131-139 (Jan. 28, 2003).

Miles, et al., "10.1: Digital Paper for Reflective Displays," 2002 SID International Symposium Digest of Technical Papers, Boston, MA, SID International Symposium Digest of Technical Papers, San Jose, CA, vol. 33/1, pp. 115-117 (May 21-23, 2002).

Penta Vacuum MEMS Etcher Specifications, http://www.pentavacuum.com/memes.htm.

Science and Technology, The Economist, pp. 89-90, (May 1999).

Search Report PCT/US05/030033 and Written Opinion, Dec. 30, 2005.

Search Report PCT/US05/030902, Jan. 26, 2006.

Search Report and Written Opinion for PCT/US05/33558 (May 19, 2005).

Search Report PCT/US05/032331 (Apr. 7, 2006).

Search Report PCT/US05/032331 (Jan. 9, 2006).

Search Report and written opinion PCT/US05/032647, Dec. 28, 2005.

Thin Film Transistors- Materials and Processes -vol. 1 Amorphous Silicon Thin Film Transistors ed. Yuo Kuo, Kluwer Academic Publishers, Boston (2004), pp. 8,9,16,17 and 53.

Xactix Xetch X Specifications, http://xactix.com/Xtech X3specs.htm. Jan. 5, 2005.

Xactix Xetch Product information.

* cited by examiner

*Step 1*

*Step 2*

*Step 3*

*Step 4*

*Step 5*

*Step 6*

*Step 7*

Step 8

Step 9

Step 10

Step 11

Step 12

Step 13

Step 14

Step 15

Step 16

Step 17

Step 18

*Step 1*

*Step 2*

*Step 3*

Step 1

Step 2

Step 3

Step 4

Step 5

Step 6

Step 7

*Step 8*

*Step 9*

*Step 10*

*Step 1*

*Step 2*

*Step 3*

*Step 4*

*Step 5*

*Step 6*

*Step 7*

Step 1

Step 2

Step 3

Step 4

*Step 1*

*Step 2*

*Step 3*

*Step 4*

*Step 1*

*Step 2*

*Step 3*

*Step 4*

Step 5

Step 6

Step 7

*Step 8*

*Step 9*

*Step 10*

*Step 11*

METHOD FOR MANUFACTURING AN ARRAY OF INTERFEROMETRIC MODULATORS

FIELD OF THE INVENTION

This invention relates generally to fabrication processes for interferometric modulator arrays and more specifically to methods for manufacturing an array of interferometric modulators.

BACKGROUND OF THE INVENTION

An interferometric modulator is a class of MEM (microelectromechanical) systems devices which have been described and documented in a variety of patents including U.S. Pat. Nos. 5,835,255, 5,986,796, 6,040,937, 6,055,090, 6,574,033 (application Ser. No. 10/084,893) U.S. Pat. No. 6,680,792 (application Ser. No. 09/974,544) U.S. Pat. No. 6,867,896 (application Ser. No. 09/966,843) and U.S. Pat. No. 7,067,846 (application Ser. No. 10/878,282), and U.S. Patent Application Publication No 2003/0072070 (application Ser. No. 10/082,397), herein incorporated by reference. One of the key attributes of these devices is the fact that they are fabricated monolithically using semiconductor-like fabrication processes. Specifically, these devices are manufactured in a sequence of steps which combine film deposition, photolithography, and etching using a variety of techniques. Costs in manufacturing processes of this sort are driven in large part by the number of steps in the sequence. Thus, a reduction in the number of masking steps in the overall manufacturing process will help to reduce manufacturing costs.

DETAILED DESCRIPTION OF THE INVENTION

Figure 1A:
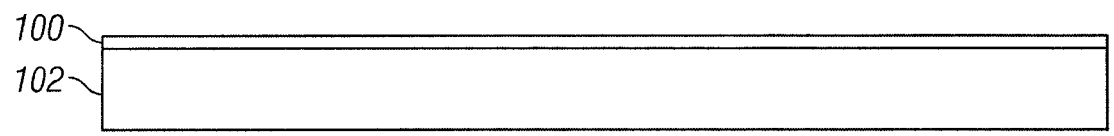
FIGS. 1A-F illustrate a 9 mask step interferometric modulator fabrication process including a step for defining a black mask and steps for an additive sacrificial layer sub-process in accordance with one embodiment of the invention.
Figure 1A:
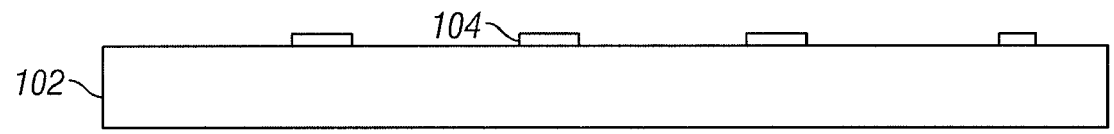
Figure 1A:
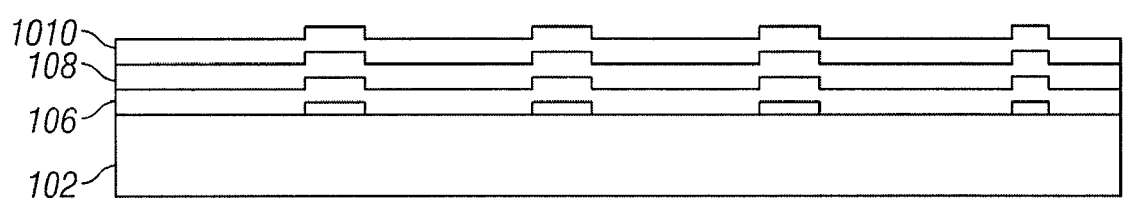
Figure 1A:
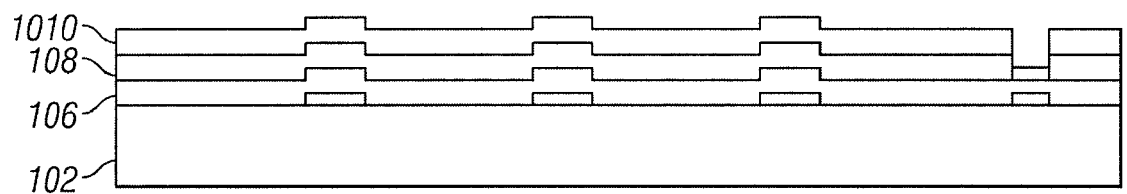

In the following detailed description of embodiments of the invention, numerous specific details are set forth such as examples of specific materials, machines, and methods in order to provide a thorough understanding of the present invention. It will be apparent, however, to one skilled in the art that these specific details need not be employed to practice the present invention. In other instances, well known materials, machines, or methods have not been described in detail in order to avoid unnecessarily obscuring the present invention.

U.S. Pat. No. 6,794,119 (application Ser. No. 10/074,562) herein incorporated by reference describes a prototypical fabrication sequence for building interferometric modulators. In general, interferometric modulator fabrication sequences and categories of sequences are notable for their simplicity and cost effectiveness. This is due in large part to the fact that all of the films are deposited using physical vapor deposition (PVD) techniques with sputtering being the preferred and least expensive of the approaches. The materials used are common throughout the liquid crystal display (LCD) industry. This is significant because this industry represents the most cost effective means for manufacturing large area arrays of devices and provides a prime infrastructure for use in building displays and other devices based on interferometric modulators or other MEM devices. This characteristic is described in U.S. Pat. No. 6,867,896 herein incorporated by reference. The materials may be etched using low-cost wet etching processes, or higher cost dry etching techniques depending on the demands of the display application and the need for dimensional control. Photolithography may be achieved using low-cost imaging tools or higher cost step and repeat machines, also dependent on the dimensional requirements of the application. The dimensional requirements are primarily dictated by the resolution of the display in display-centric applications.

FIGS. 1A-1F illustrate one embodiment of an interferometric modulator fabrication sequence which utilizes 9 masking steps. Step 1 shows the deposition of a stack of films 100 on a substrate 102. The stack 100 is used in the definition of a black mask. More detail on how a black mask may be incorporated into an interferometric modulator array is described in U.S. Pat. No. 6,741,377 (application Ser. No. 10/190,400) herein incorporated by reference. The stack 100 is nominally deposited by sputtering and is subsequently patterned in Step 2. Patterning refers to a class of techniques which usually include a lithographic step, a development step, and a material etch step. These are well known in the art and described in detail in the aforementioned patents and patent applications.

In Step 3, an insulator 106, an optical film 108, and a conductor 1010 are deposited also using sputtering and are of a thickness and composition which has been described in the aforementioned patents and patent applications. Examples of the insulator, optical film, and conductor include silicon dioxide, chrome, and aluminum respectively. The optical film 108 and the conductor 1010 have been subsequently patterned in Step 4.

For interferometric modulator matrices that are to be multi-color displays, some mechanism must be provided for depositing and patterning sacrificial layers with multiple heights. The height of the sacrificial layer is what determines one of the color modes or states of the interferometric modulator during operation. Typical full-color displays require matrices capable of display in at least three colors, Red, Green, and Blue.

Figure 1B:
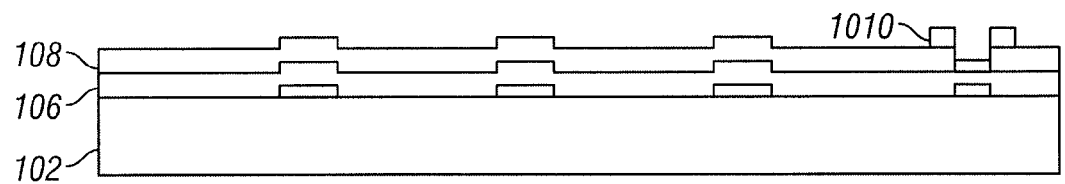
Figure 1B:
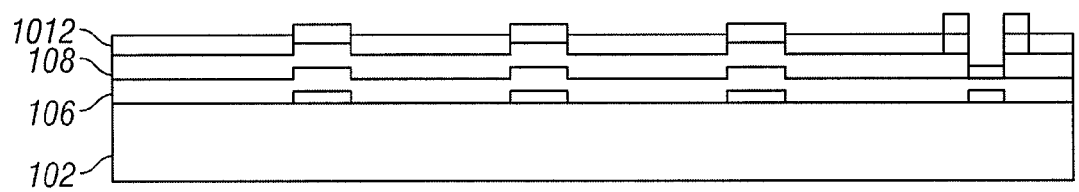
Figure 1B:
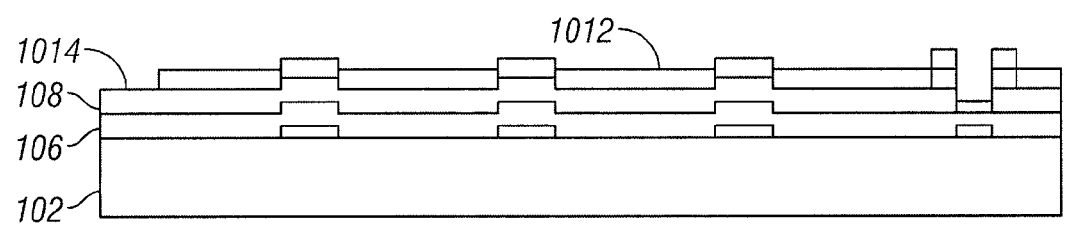

FIG. 1B begins with Step 5 where the conductor 1010 has been further patterned to form the conductor rails. These rails are used to enhance the conductivity of the underlying chrome and thereby improve the performance of the overall display by reducing R/C time constants. In Step 6, an insulating film or films 1012 has been deposited. Step 7 reveals where insulator film/s 1012 have been patterned to expose the optical film 108 as a lead 1014 for bonding at a later step.

Figure 1C:
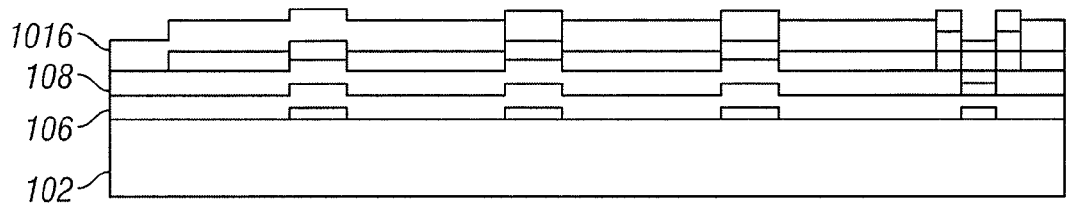
Figure 1C:
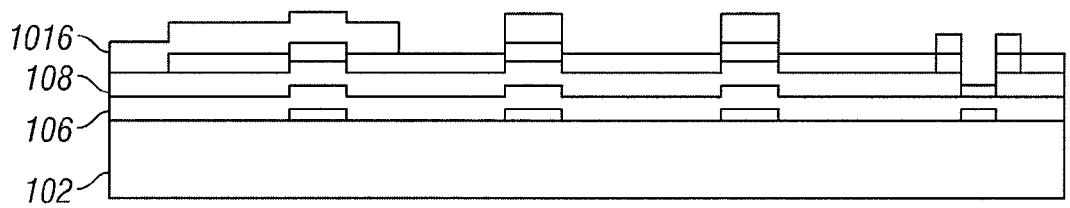
Figure 1C:
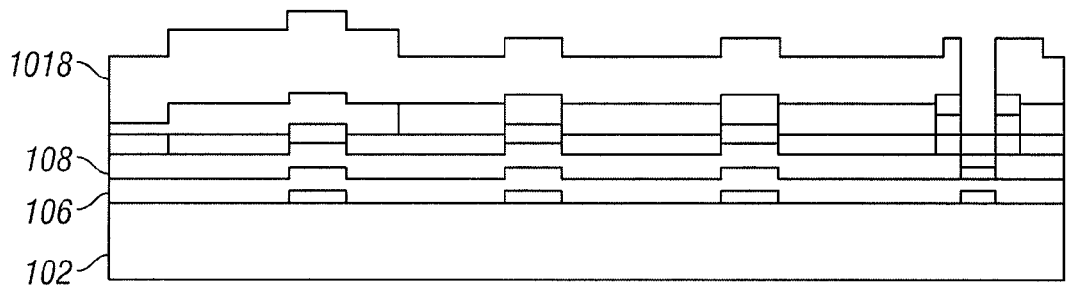

FIG. 1C reveals the deposition of a first sacrificial layer 1016 in Step 8 using sputtering and its subsequent patterning in Step 9. Step 10 shows the deposition of a second sacrificial layer 1018 also using sputtering.

Figure 1D:
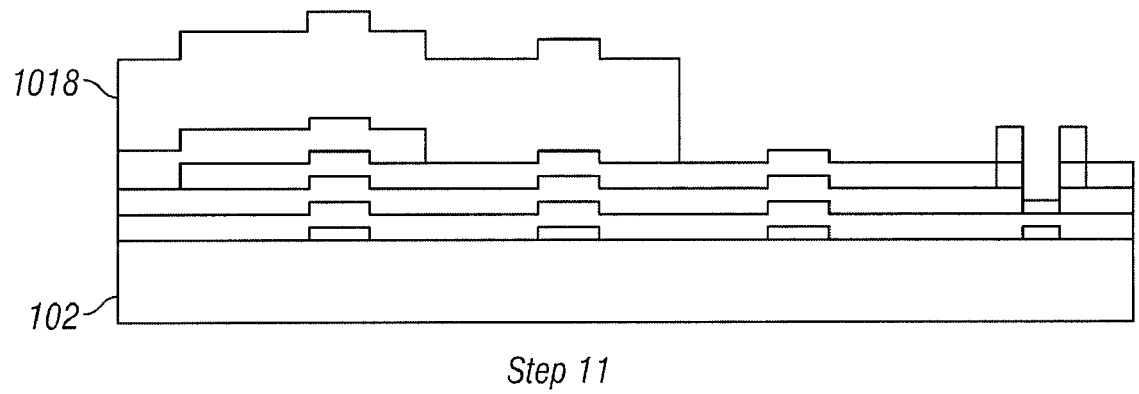
Figure 1D:
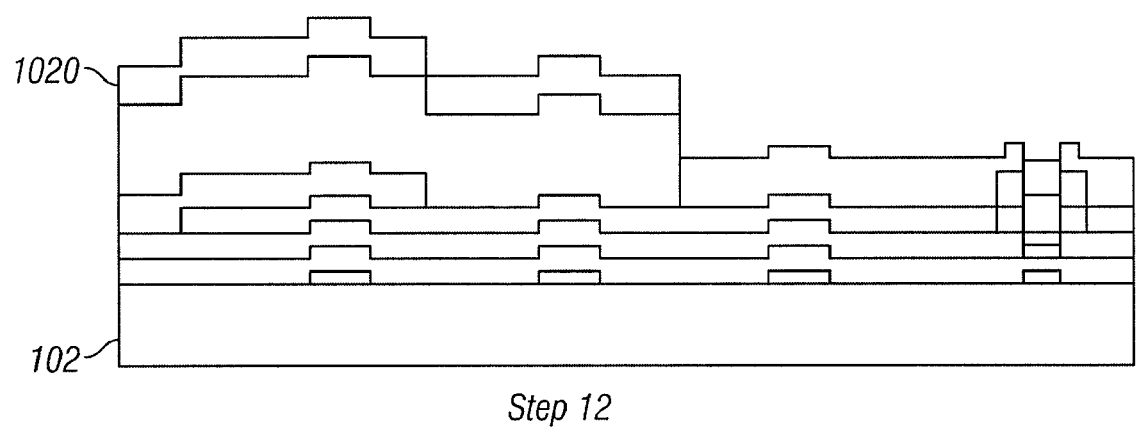
Figure 1D:
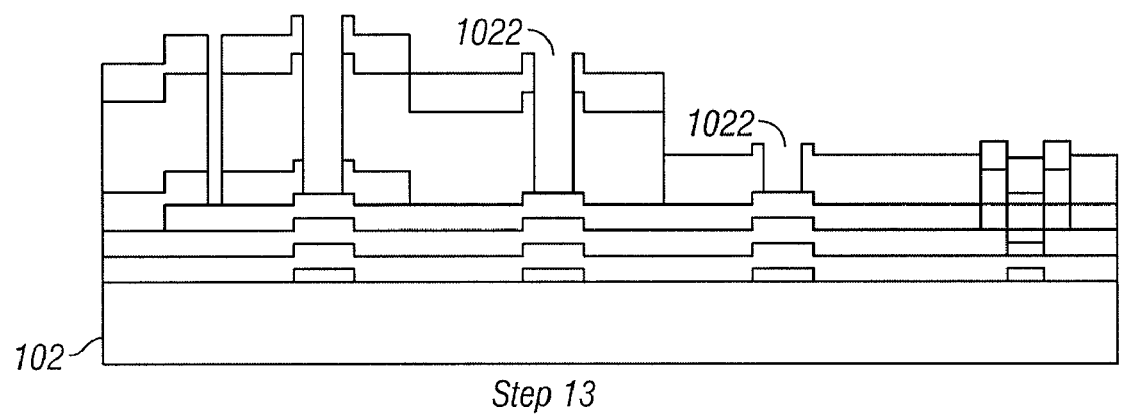

FIG. 1D begins in Step 11 with the patterning of sacrificial layer 1018 followed by the deposition of a third sacrificial layer 1020 in Step 12. In Step 13, an etch step is performed, the goal of which is to define support post vias 1022. This may be done using either wet or dry etching techniques as all of the previous etches may be accomplished.

Figure 1E:
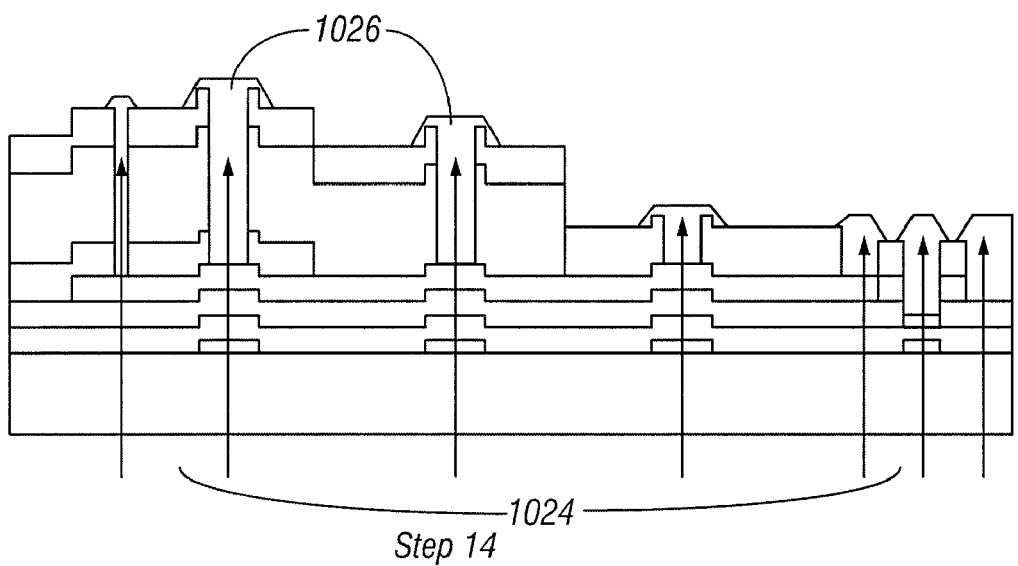
Figure 1E:
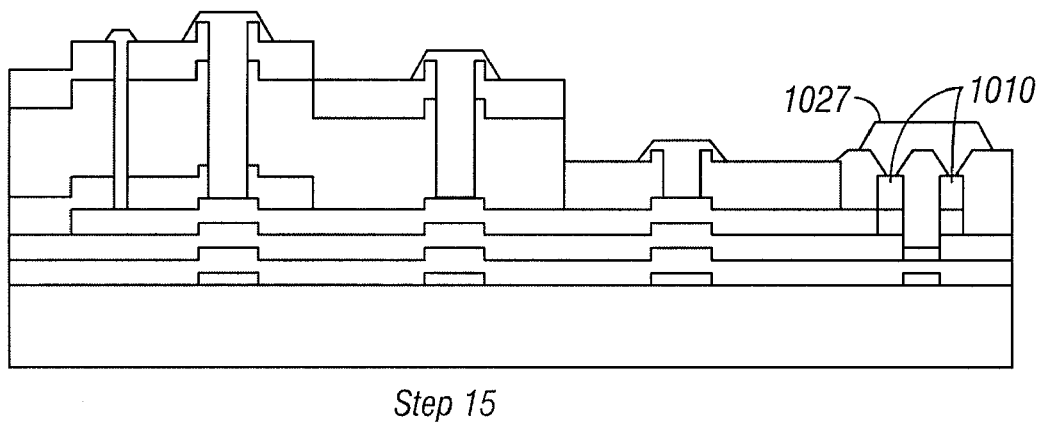
Figure 1E:
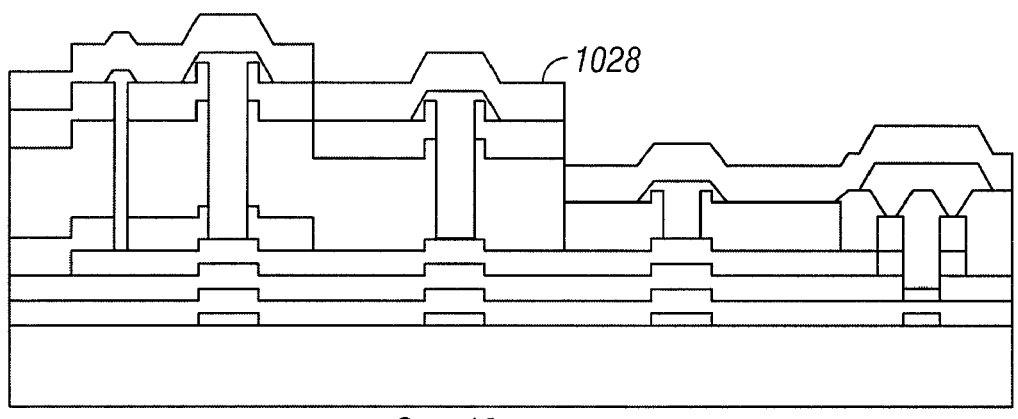

FIG. 1E reveals the definition of support posts 1024. More detail on how this process can be accomplished is contained in U.S. Pat. No. 6,794,119 herein incorporated by reference. In one embodiment, a negative acting photosensitive material is spun onto the structure and is exposed through the post support vias through the backside of the wafer illustrated by incident light arrows 1026. The post support vias are transparent to the light because the sacrificial layers are designed to be opaque. Thus the sacrificial layers act as a mask and save on an additional masking step. Step 14 shows support posts 1024 that are formed in each support post via 1022. The support posts 1029 may be polymeric, though they could be of any photo-definable material or material matrix. Step 15 shows the definition of a planar cover material 1028 which is used to smooth the topology presented by conductor rails 1010. This is accomplished using standard lithography. In Step 16 a mechanical film/s 1030 has been deposited.

Figure 1F:
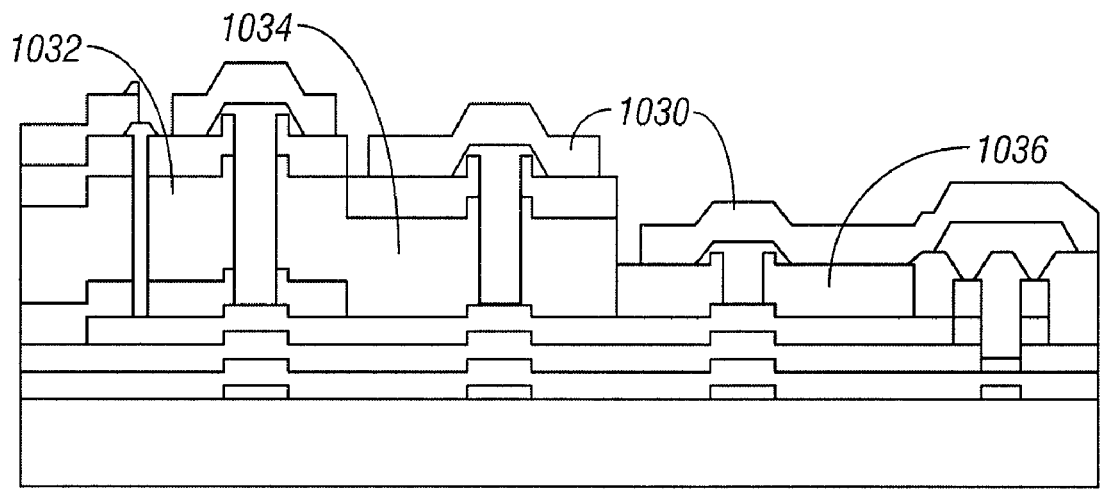
Figure 1F:
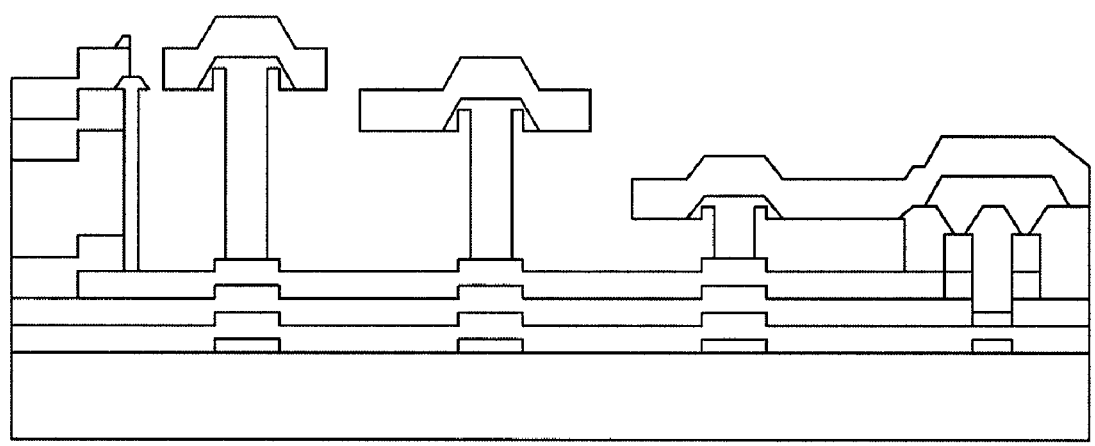

FIG. 1F begins with Step 17 where the mechanical layer 1030 has been patterned to form the interferometric modulator matrix Red, Green, and Blue columns which are distinguished by the different sacrificial layer heights, 1032, 1034, and 1036. Finally, in Step 18, the sacrificial layer has been removed using one of a variety of etching techniques. The preferred technique uses $XeF_2$ gas to spontaneously etch the sacrificial material. More detail on this approach can be found in U.S. Pat. No. 6,794,119 herein incorporated by reference.

Figure 2:
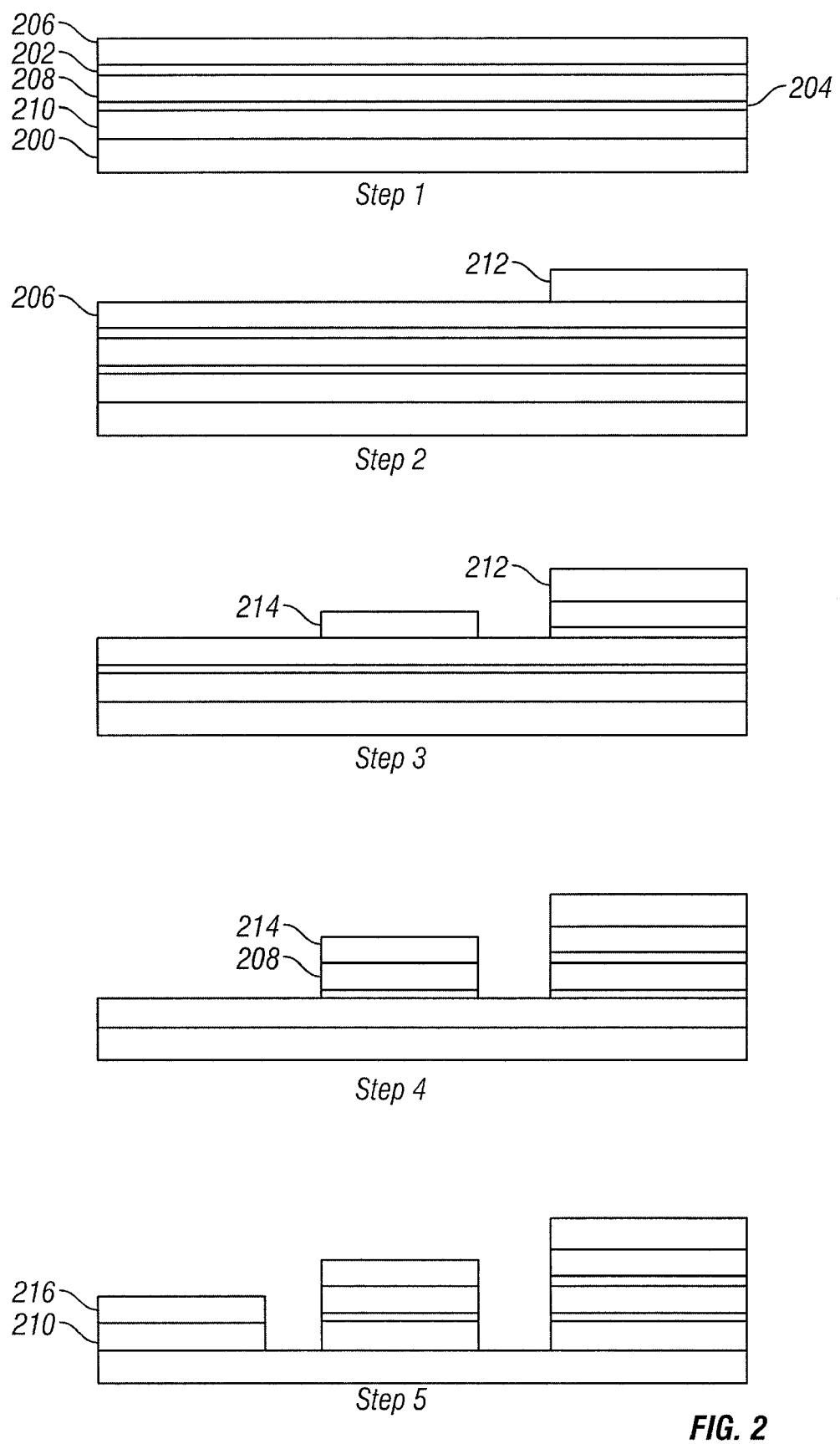
FIG. 2 illustrates a subtractive sacrificial layer sub-process in accordance with another embodiment of the invention.

Steps 8-12 of the previous sequence represent the sacrificial layer subprocess, i.e. the sequence of steps whereby the sacrificial layer heights are defined and patterned. This is an additive approach. FIG. 2 illustrates an alternative sacrificial layer sub-process that includes a subtractive approach. Referring to FIG. 2, substrate 200 is coated with a multilayer sacrificial stack which comprises two different materials which are both etchable using $XeF_2$, but which are wet etched, or potentially dry etched, using different chemistries. Silicon and molybdenum are two candidates, though there are others, for both these substances can be etched using $XeF_2$ However, silicon can be wet etched by hot solutions of tetramethylammonium hydroxide (among other etchants) while molybdenum can be etched using solutions of phosphoric, acetic, and nitric acid. Step 1 shows the multilayer stack deposited on substrate 200, with silicon layers 202 and 204 acting as an etch stop, and molybdenum layers 206, 208, and 210 acting as the height definition layers. The first resist layer 212 has been defined in Step 2 and in Step 3, the first patterning step has been accomplished using this layer with the pattern then transferred to the molybdenum layer 206. The next resist layer 214 has also been defined in Step 3. Step 4 shows the subsequent patterning step which involves a two stage etch step. Masked by resist layer 214, the first stage molybdenum layer 208 is patterned using the appropriate etchant, and in the second stage, silicon etch stop layer 204 has been etched through. Finally, in Step 5, molybdenum layer 210 has been etched by virtue of being masked by a resist layer 216. Because of the existence of etch stop layers 202 and 204, the etchant can be used to pattern the height definition layers without concerns about overetching. The material may be exposed for as long as possible to insure complete etching of the feature with fear of etching into the next height definition layer which would compromise the overall process.

Figure 3:
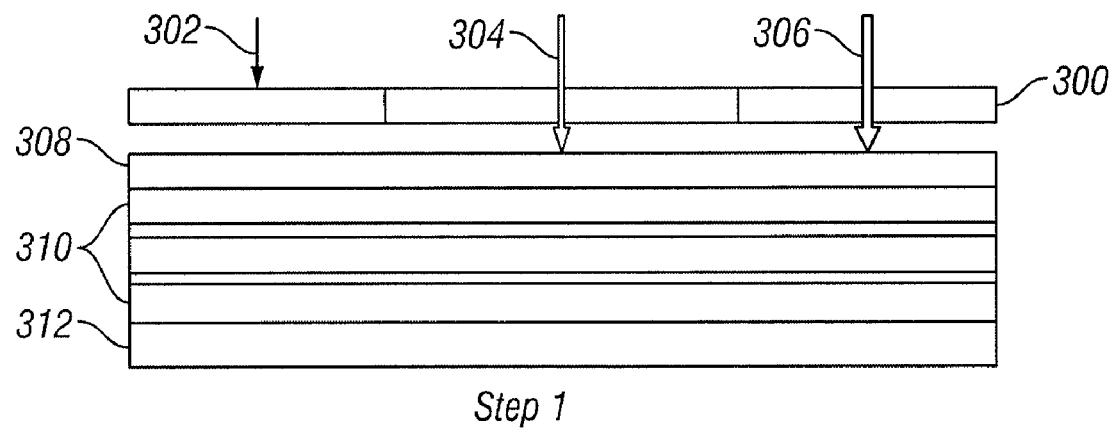
FIG. 3 illustrates a subtractive sacrificial layer sub-process optimized using gray-scale lithography in accordance with another embodiment of the invention.
Figure 3:
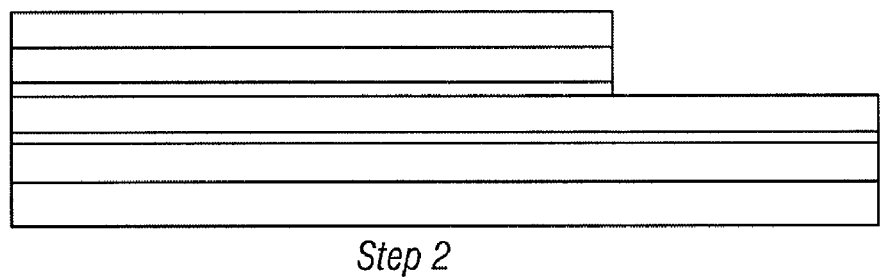
Figure 3:
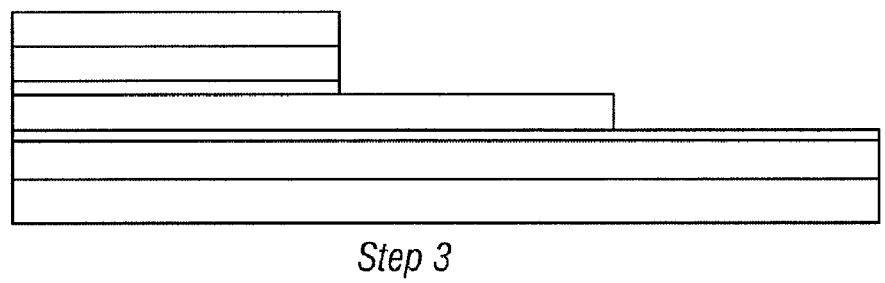

The sub-process of FIG. 2 requires three separate lithography steps. Using gray-scale lithography this may be reduced. FIG. 3 illustrates a variation on this theme which exploits gray-scale lithography to reduce the number of masking steps to one. Referring to FIG. 3 a multilayer etch stack 310 has been deposited on substrate 312 and is identical to the etch stack of FIG. 2. A gray-scale mask 300 which is like a normal lithographic mask except that regions on it may be defined to have variable levels of transmission as opposed to binary levels in traditional masks is positioned over the stack 310. There are numerous ways of preparing such masks as is well known in the art. For this case, three regions have been defined with three different transmission levels shown with zero transmission at a region 302, moderate transmission at a region 304, and the highest at a region 306. In Step 1 when a photoresist layer 308 over the stack 310 is exposed, a well-timed development stage will result in the photoresist below region 306 developing first. The developer stage is a standard part of patterning where photoresist or other photosensitive material, which has been exposed to light, is dissolved away in a chemical solution specially designed for this task. The consequence of the first development stage is that the mutilayer etch material under region 306 is exposed. In Step 2 the first etch step is accomplished which defines the first height. In Step 3, after another developer stage, the material under region 304 is exposed and etched appropriately while the region under 306 is etched to the next level. Finally a solvent or other resist removal process is used to finish off the process.

FIGS. 4A-C, 5A-B, and 6A-B illustrate reduced mask fabrication sequences. These sequences differ from the sequence of FIGS. 1A-F in that they do not contain a black mask, a conductor, or a conductor planarization layer. Certain applications and device designs may eliminate or reduce the need for a black mask. Other applications may not require the addition of a conductor or may have their conductivity sufficiently increased by the presence of a transparent conductor.

Figure 4A:
FIGS. 4A-C illustrate a 4 mask interferometric modulator fabrication process without a black mask or multi-height sacrificial layer in accordance with another embodiment of the invention.
Figure 4A:
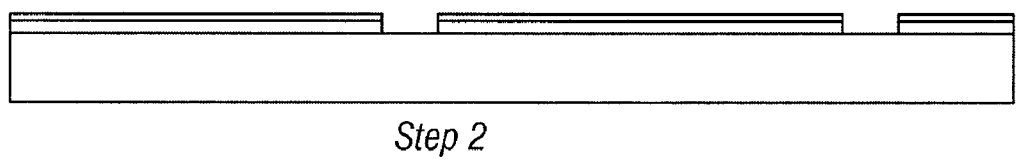
Figure 4A:
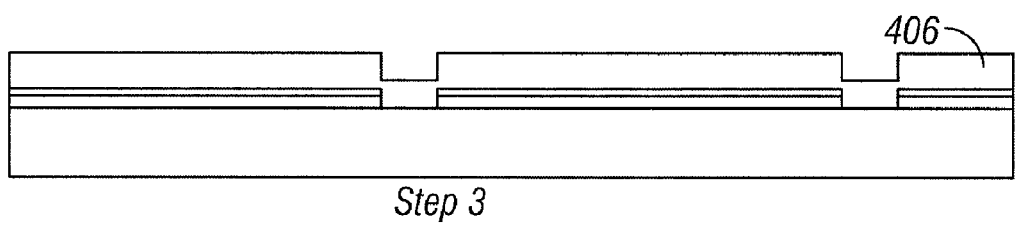
Figure 4A:
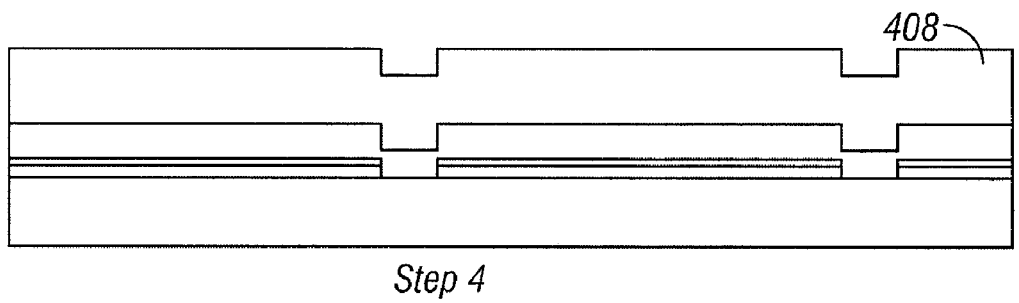
Figure 4B:
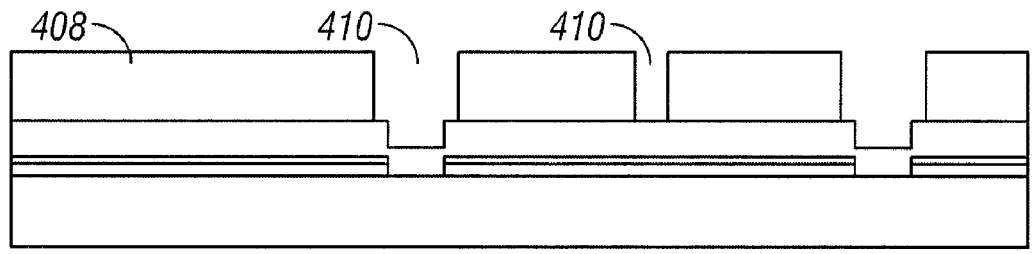
Figure 4B:
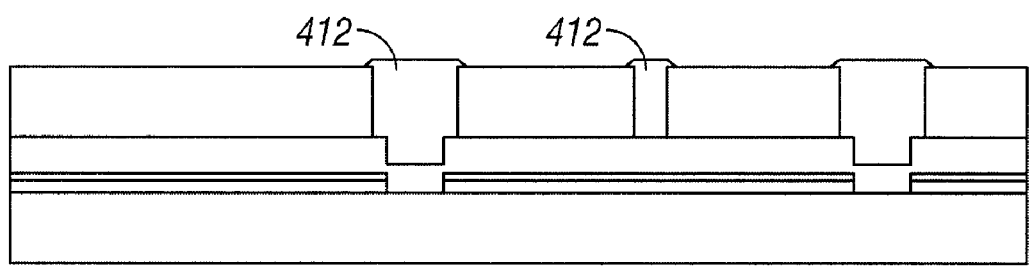
Figure 4B:
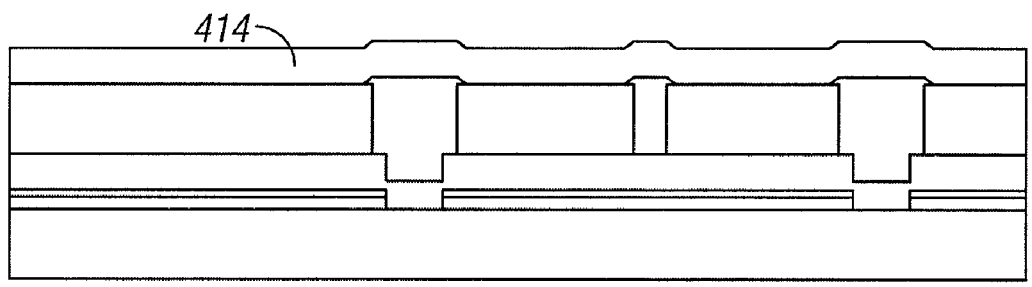
Figure 4C:
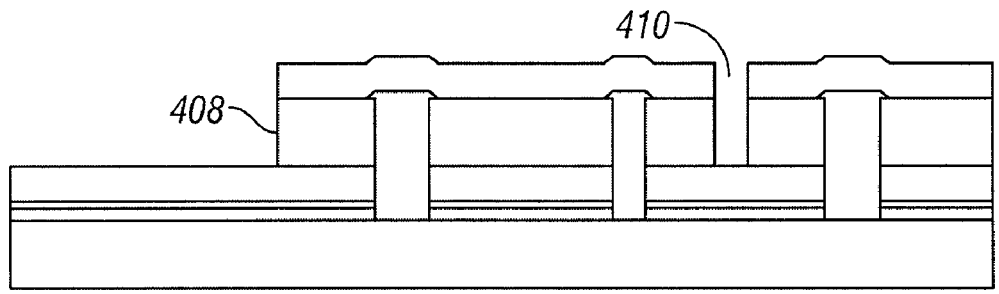
Figure 4C:
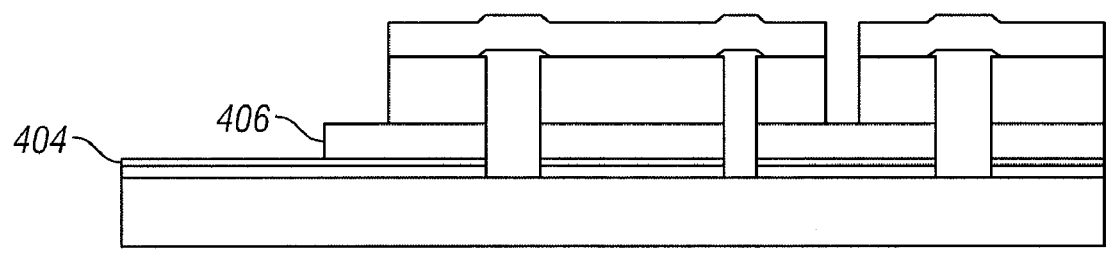
Figure 4C:
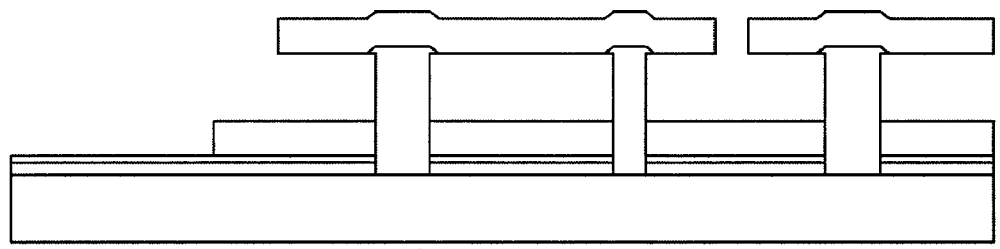

FIGS. 4A-C illustrate a sequence that uses 4 mask steps. Beginning with Step 1 in FIG. 4A, optical film/s 402 are deposited on a substrate 400. The optical films may or may not include a transparent conductor 404. In Step 2 these films are patterned and in Step 3 an insulating film or films 406 is/are deposited followed by the deposition of a sacrificial material 408 in Step 4. FIG. 4B begins with Step 5 where post support vias 410 have been etched into the sacrificial spacer 408. Spacer posts 412 are formed in Step 6 according to the processes described above, and a mechanical film 414 has been deposited in Step 7.

FIG. 4C starts in Step 8 where sacrificial layer 408 has been etched back, optional etch hole 410 has been formed, and insulator 406 has been etched subsequently in Step 9 to expose optical film 404 for later bonding. The sacrificial layer has been removed in Step 10.

Figure 5A:
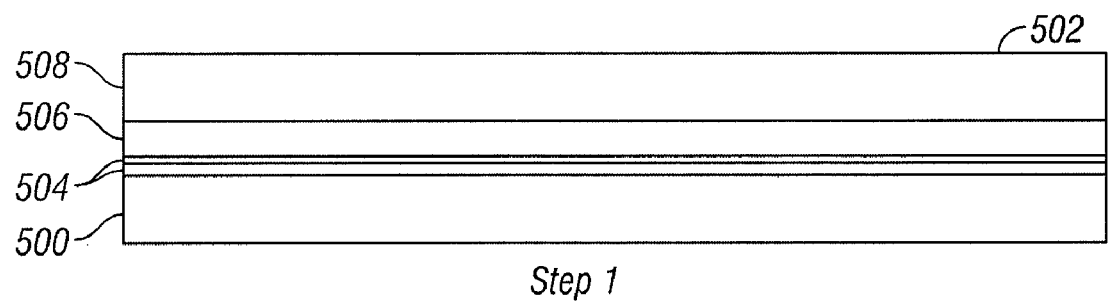
FIGS. 5A-B illustrate a 3 mask interferometric modulator fabrication process without black mask or multi-height sacrificial layer in accordance with another embodiment of the invention.
Figure 5A:
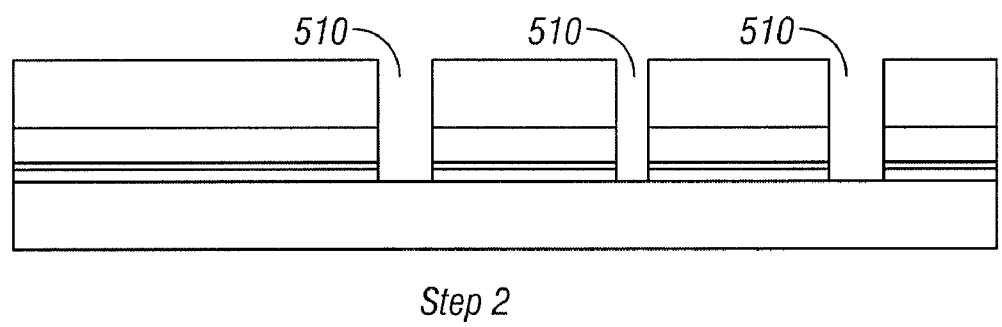
Figure 5A:
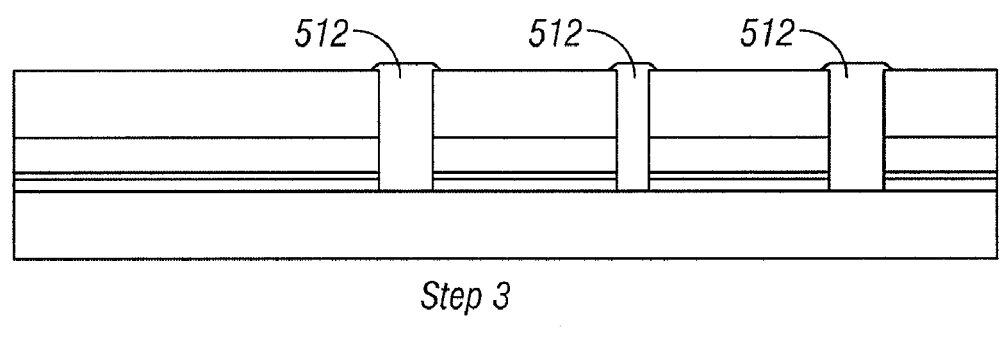
Figure 5A:
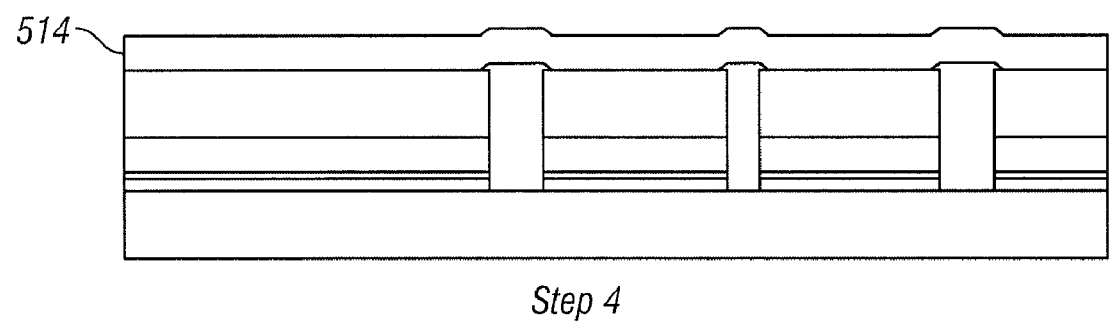
Figure 5B:
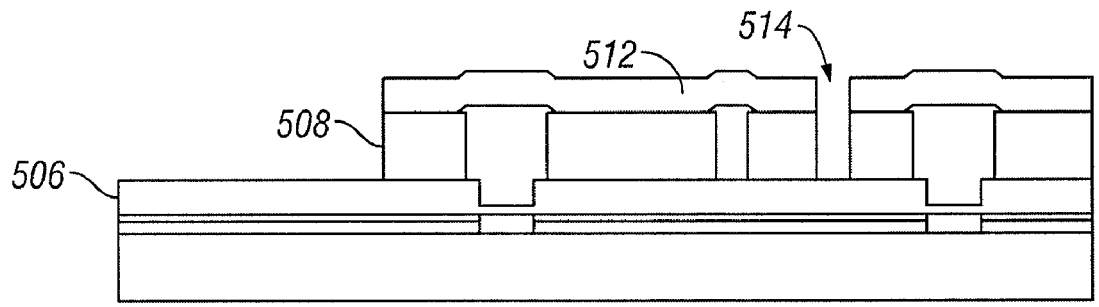
Figure 5B:
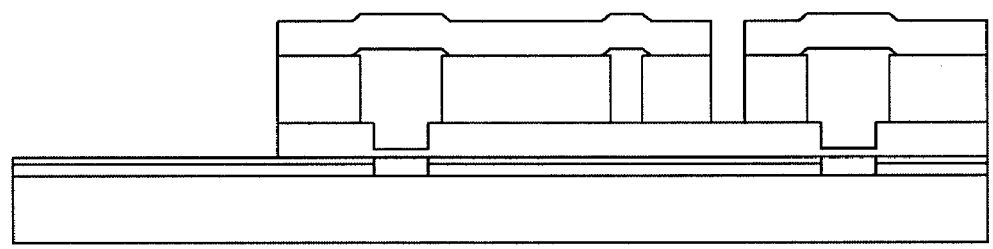
Figure 5B:
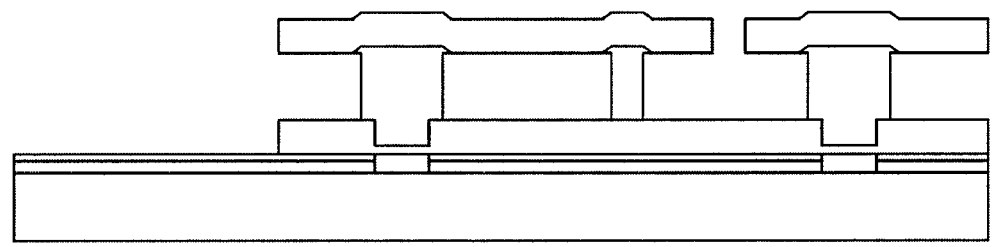

FIGS. 5A-B illustrate a 3 mask step process. Starting with Step 1 in FIG. 5A a starter stack 502 has been deposited on substrate 500. The starter stack 502 comprises optical/conductor films 504, insulator 506, and a sacrificial layer 508. Step 2 shows the etching of the entire starter stack which constitutes the step consolidation that removes a mask step, and provides support post vias 510. In Step 3, the support posts 512 have been formed and a mechanical film 514 is deposited in Step 4.

FIG. 5B shows in Step 5 the etching of the mechanical film 512, the sacrificial layer 508, and etch hole 514. Step 6 illustrates the etching of the insulator 506. Finally the sacrificial layer is removed using $XeF_2$ in Step 7. Steps 5 and 6 represent the consolidation of a mask step in this sequence since only one mask step is required to accomplish both.

Figure 6:
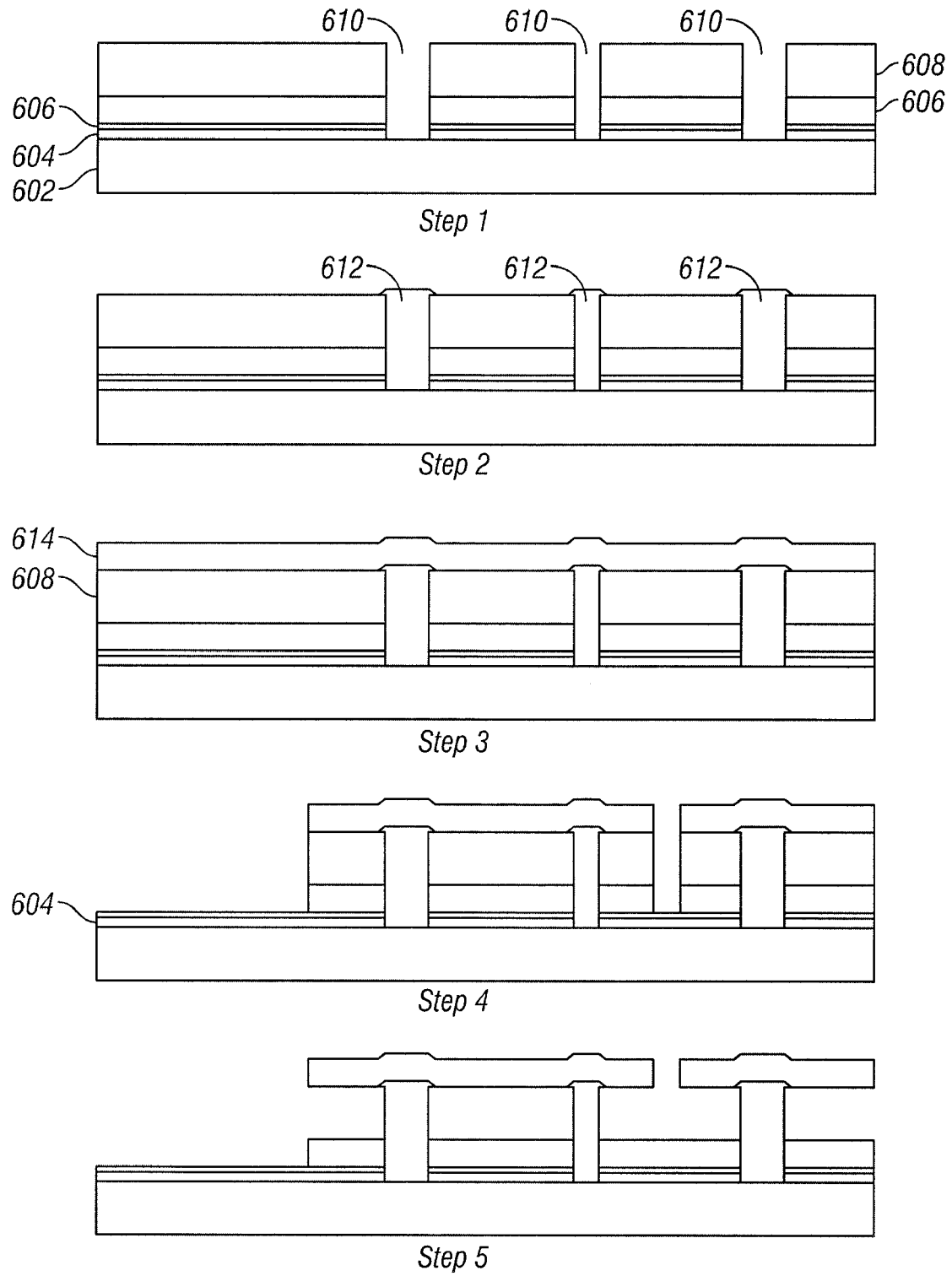
FIG. 6 illustrates a 3 mask interferometric modulator fabrication process without a black mask or multi-height sacrificial layer in accordance with another embodiment of the invention.

FIG. 6A illustrates a 2 mask step process. Referring to FIG. 6A, in Step 1 a starter stack comprising a substrate 602, optical/conductor films 604, an insulator 606, and a spacer 608 is patterned to form support post vias 610. In Step 2, the vias 610 are filled with a support post material 612, and a mechanical film layer 614 is deposited in Step 3. In Step 4, the mechanical layer 614, the spacer 608, and the insulator 606 are etched to expose optical film layers 604 for subsequent bonding. Step 5 is a final step where the sacrificial layer 608 is removed.

Figure 7:
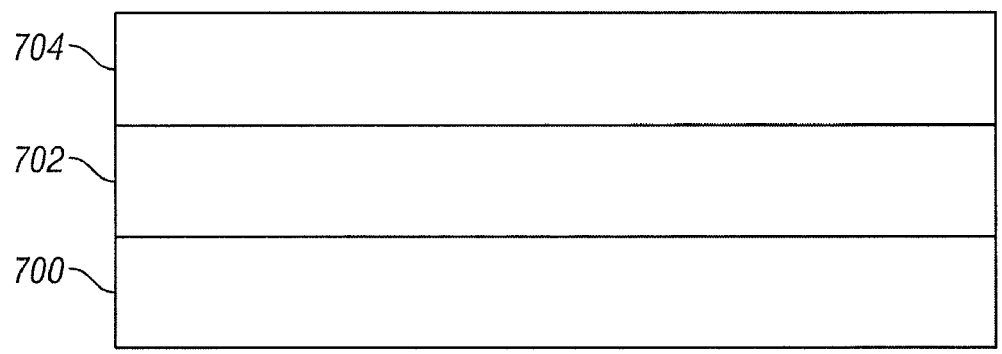
FIG. 7 illustrates a technique for consolidating the formation of post holes and support posts in accordance with another embodiment of the invention.
Figure 7:
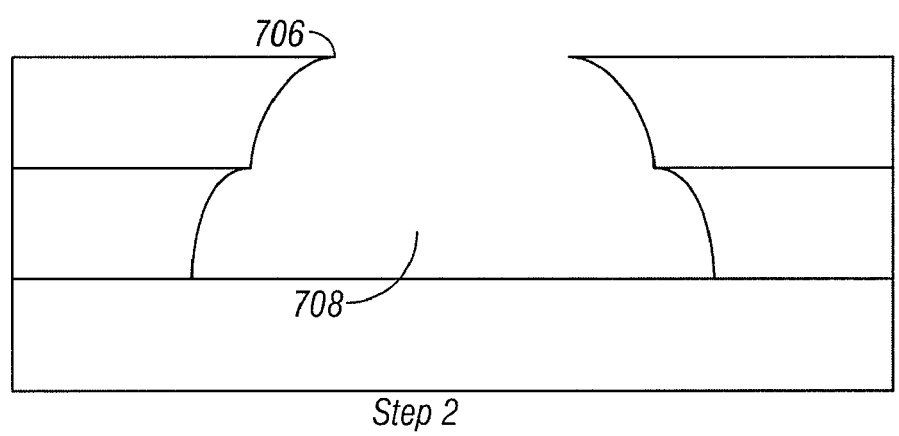
Figure 7:
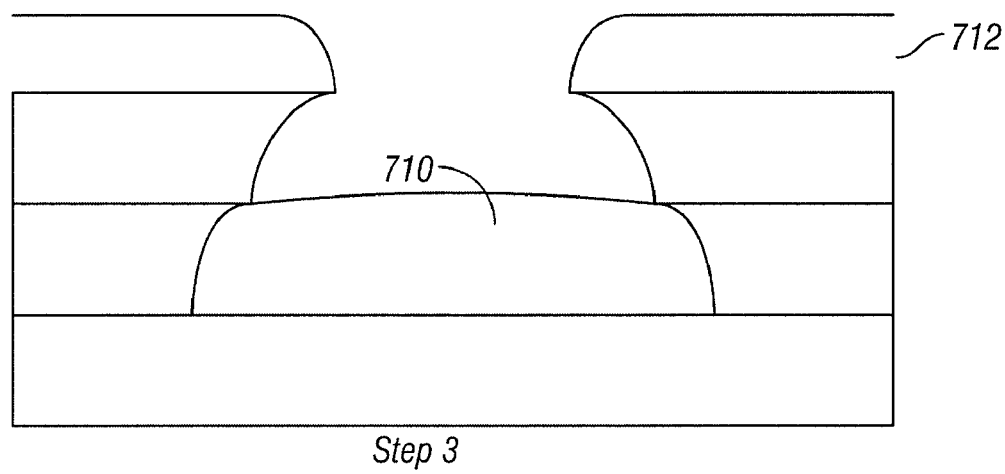
Figure 7:
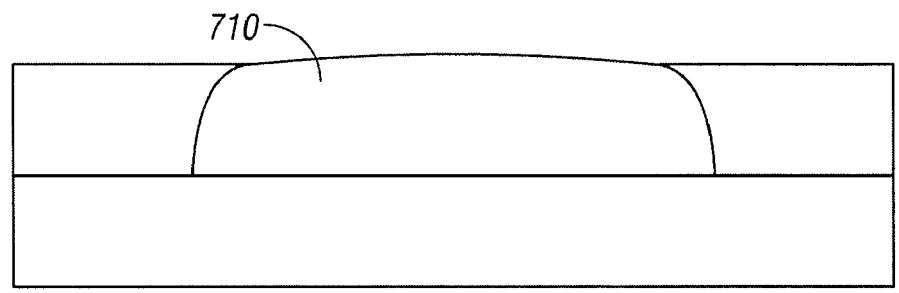

FIG. 7 illustrates a further means for consolidating mask steps by combining the process for forming the support post vias with the formation of the support posts themselves. This approach relies on a technique which is known in the industry as lift-off. Basically this means that a pattern can be formed in a deposited material not by etching it after deposition, but by forming the pattern during the deposition. One way of achieving this is explained in FIG. 7.

In Step 1 of FIG. 7, a starter stack 702 has been deposited on a substrate 700 and a negative photoresist 704 has been has been spun on. While positive a photoresist may be used, negative resist has the property that a so-called "re-entrant" profile may be formed. A re-entrant profile is one in which the top of the resist is effectively undercut during development. Negative resist differs from positive resist in that exposed negative resist remains during the development process Mask 710 serves to block light 708 and prevent the exposure of the photoresist below. However diffractive effects actually cause some of the incident light to be redirected underneath the mask. This redirected light 706 produces a "lip" 712 and associated re-entrant profile during Step 2, which shows in the resist after development.

The opening in the resist is used as a mask to define the support post via 714 when it is etched into the starter stack 700. Step 3 illustrates a lift-off process for establishing the support posts which in this case are deposited using some form of physical vapor deposition (PVD) technique as opposed to being spun on and photopolymerized using topside or backside exposure. Because of the re-entrant profile, a distinct break is formed between the post material in the hole 718 and the excess post material on the surface of the photoresist 716. Thus in Step 4, the excess material is removed in a lift-off process which uses a liquid solvent to dissolve the remaining photoresist and remove all post material which resides on top of it.

Figure 8:
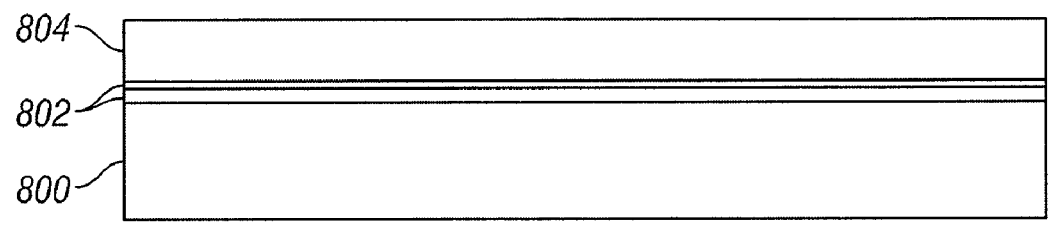
FIG. 8 illustrates an embodiment in which the support posts are eliminated and the mechanical film is self-supporting.
Figure 8:
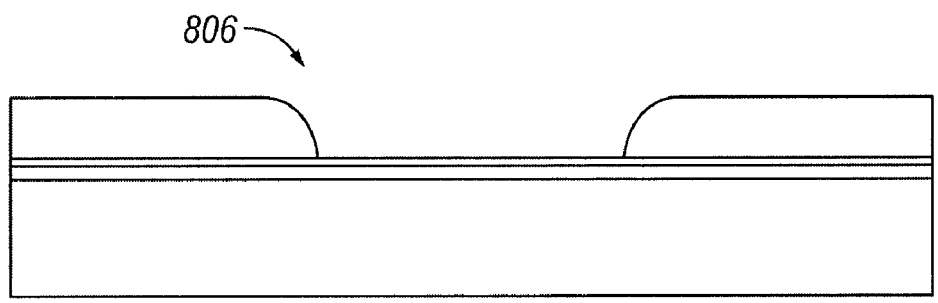
Figure 8:
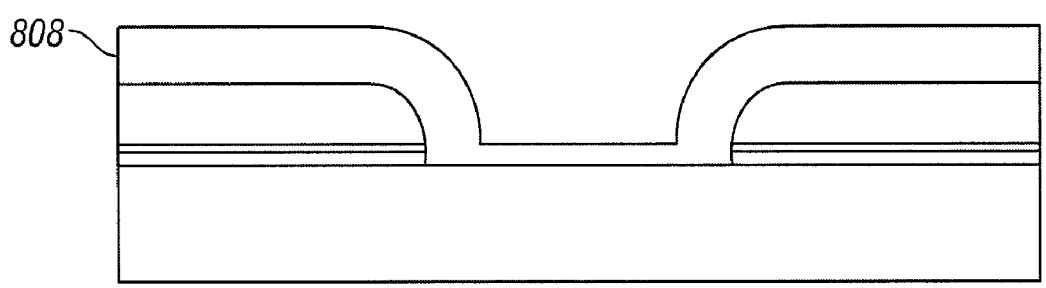
Figure 8:
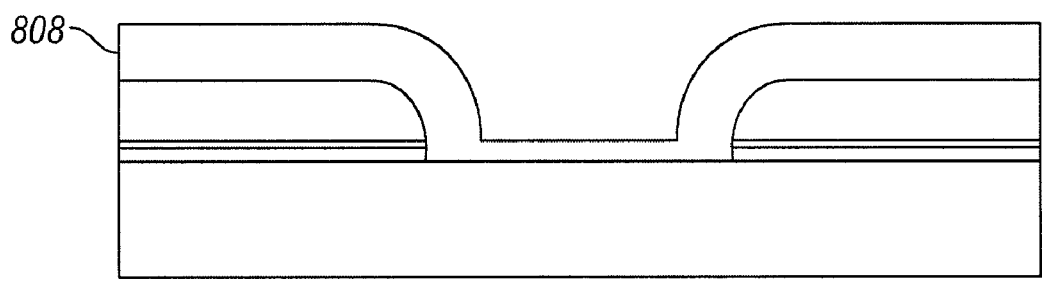
Figure 9A:
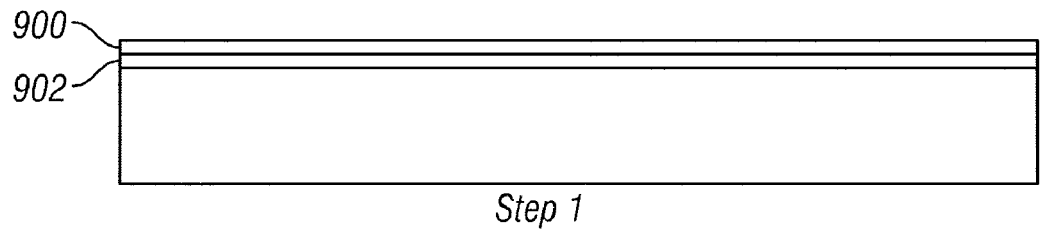
FIGS. 9A-D illustrate a 6 mask fabrication process for building an interferometric modulator with concealed supports in accordance with another embodiment of the invention.
Figure 9A:
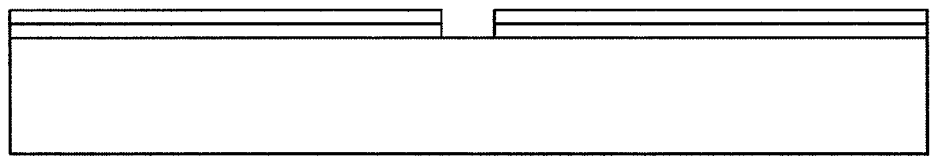
Figure 9A:
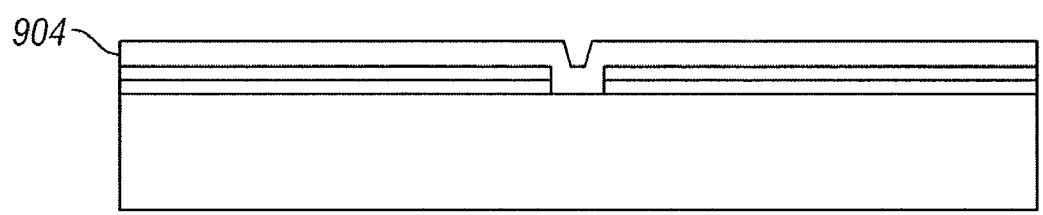
Figure 9A:
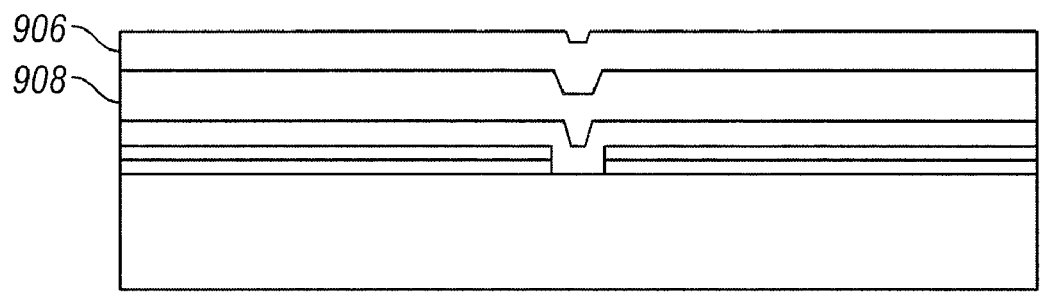
Figure 9B:
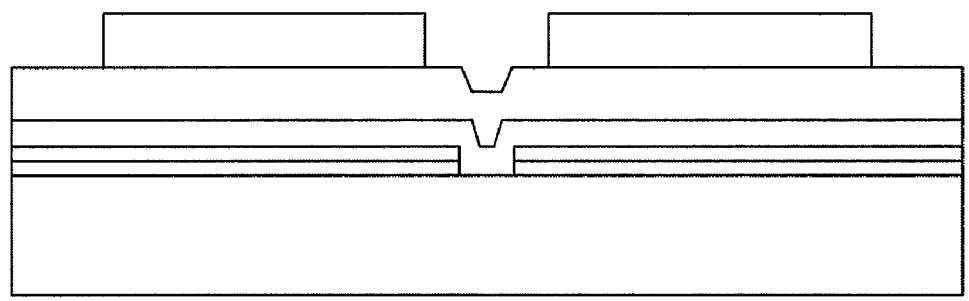
Figure 9B:
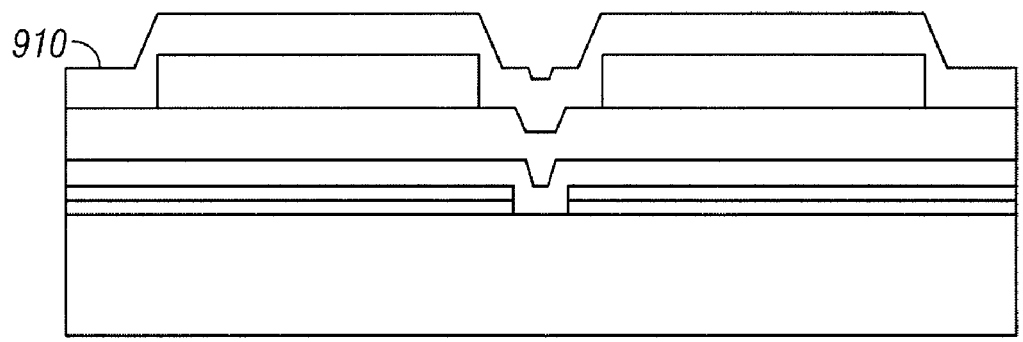
Figure 9B:
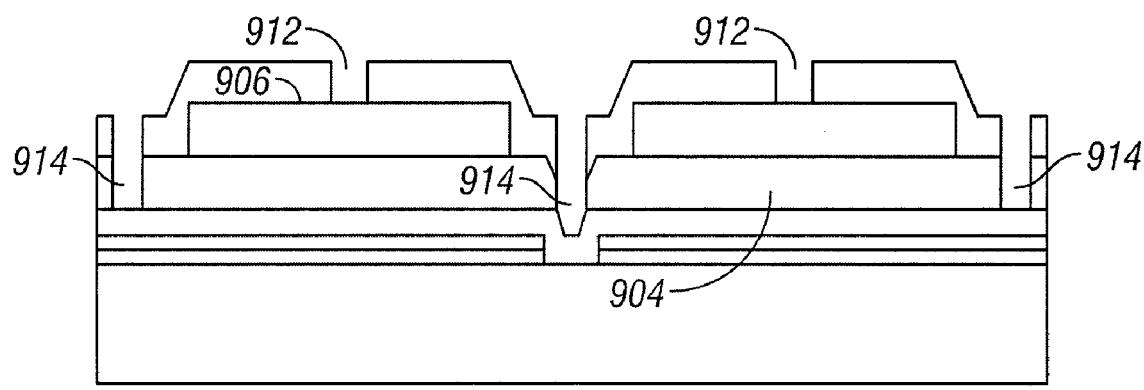
Figure 9C:
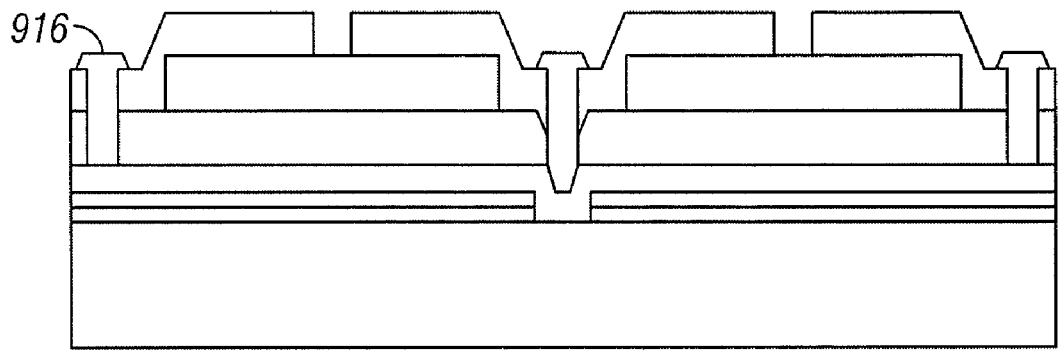
Figure 9C:
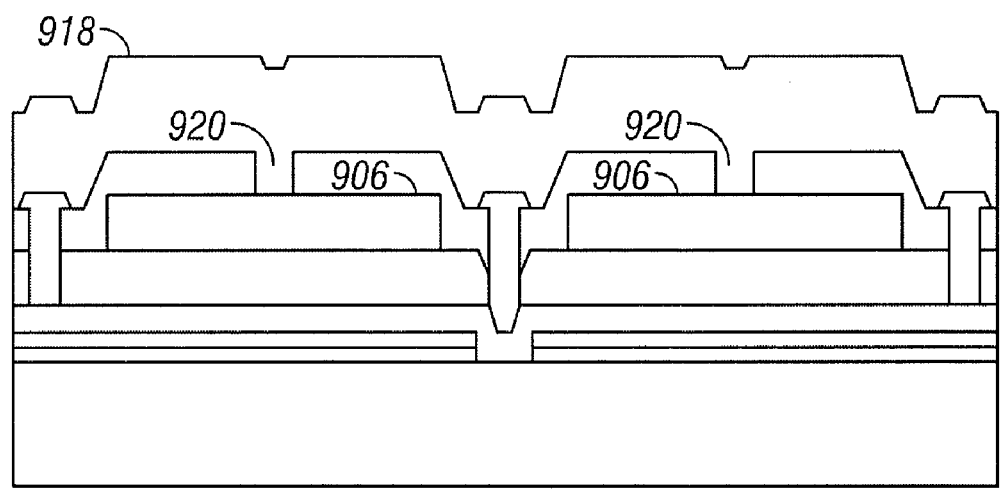
Figure 9D:
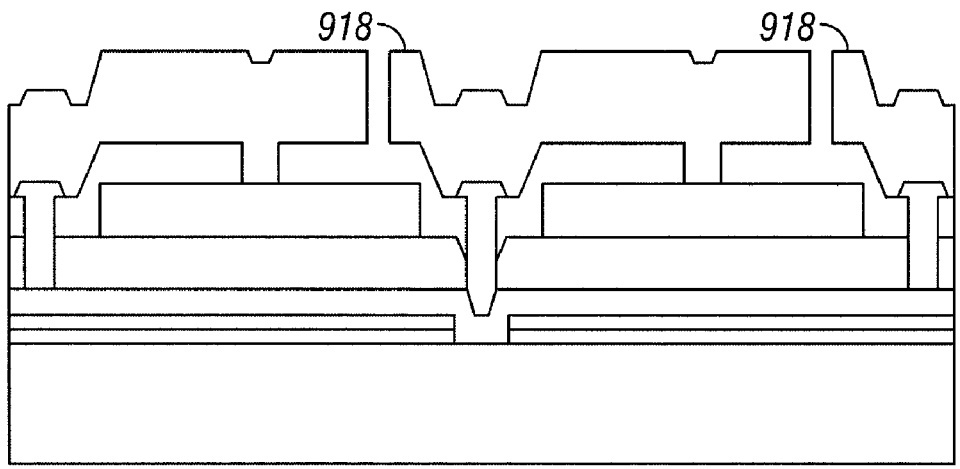
Figure 9D:
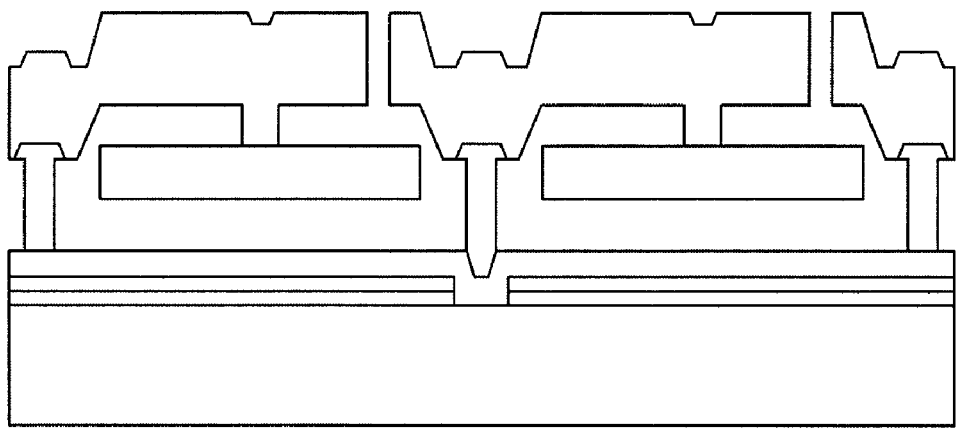

In another embodiment, the fabrication process is further streamlined by the elimination of the support posts. This is shown in FIG. 8 and involves the use of the mechanical film in a self-supporting role. Beginning in Step 1 a starter stack, comprising optical films 802 and sacrificial film 804, is shown deposited on substrate 800. By proper application of etching techniques, a via, 806, is etched onto the stack which exhibits a sloped profile. That is to say, the sidewalls of the via have a profile which is opposite that of the re-entrant profile described in FIG. 7. Because of this, when mechanical film 808 is deposited as in Step 3, the resulting film is conformal and covers the slopes of the via without any break. When the sacrificial film, 808, is removed in step 4, the mechanical film remains standing because it supports itself by being attached to the substrate. This technique may be utilized in all of the process sequences described within this patent application. Advanced interferometric modulator architectures such as those described in patent application Ser. No. 08/769,947 filed on Dec. 19, 1996, now abandoned (a divisional application of which is U.S. Pat. No. 6,680,792 herein incorporated by reference), may also be fabricated using extensions of the previously described process sequences. In this architecture the support structure for the movable mirror is defined separately and positioned in such a way as to be hidden from view. Such a design offers improvements in fill factor, and uniformity in performance.

Referring now to FIGS. 9A-D of the drawings, beginning with Step 1 in FIG. 9, optical films 900 and 902 have been deposited and subsequently patterned in Step 2. Step 3 reveals the deposition of insulator film 904, followed by the deposition of a sacrificial layer, 908, and a mirror material, 906. The mirror is shown after it has been patterned in Step 5, and an additional sacrificial material, 910, has been deposited in Step 6. Step 7 illustrates how the supports and mechanical connections are formed. The patterning which occurs in this step is such that vias 912 etch until stopped by mirror 906, while vias 914 are etched, in the same step, until stopped by insulator film 904 which may be an oxide layer. In this way, and as shown in Step 8, polymer supports 916, are formed using backside exposure techniques to expose the vias 914. Step 9 reveals how a mechanical support layer 918, is deposited and consequently forms a mechanical connection to mirror 906 at the junctions indicated by 920. In Step 10, etch holes 22 are formed, and the entire structure is released in Step 11 using a gas phase etchant.

The fabrication sequences above are meant to illustrate various methods for building interferometric modulator matrices using different mask counts. They are not meant to be limiting in any way in terms of materials used, steps consolidated, or order of steps.

What is claimed is:

1. A method for manufacturing an array of interferometric modulators, each interferometric modulator comprising first and second optical layers which when the interferometric modulator is in an undriven state are spaced by a gap of one size, and when the interferometric modulator is in a driven state are spaced by a gap of another size, the size of the gap determining an optical response of the interferometric modulator, the method comprising:

fabricating an interferometric modulator of a first type characterized by a first gap size between its first and second optical layers when in the undriven state;

fabricating an interferometric modulator of a second type characterized by a second gap size between its first and second optical layers when in the undriven state;

fabricating an interferometric modulator of a third type characterized by a third gap size between its first and second optical layers when in the undriven state, wherein fabricating the interferometric modulators of the first, second, and third types comprises:
  depositing a first sacrificial layer, the first sacrificial layer having a first thickness;
  depositing a second sacrificial layer over the first sacrificial layer, the second sacrificial layer having a second thickness;
  depositing a third sacrificial layer over the second sacrificial layer, the third sacrificial layer having a third thickness;
  patterning at least two of the first, second, and third sacrificial layers;
  wherein the first gap size is equal to or greater than a sum of the first, second, and third thicknesses;
  wherein the second gap size is equal to or greater than a sum of two of the first, second, and third thicknesses; and
  wherein the third gap size is equal to or greater than one of the first, second, and third thicknesses.

2. The method of claim 1, wherein the interferometric modulators of the first, second, and third types are formed in first, second, and third regions, respectively, and wherein fabricating the interferometric modulators of the first, second, and third types comprises in sequence:
  depositing the first sacrificial layer in the first, second, and third regions;
  removing the first sacrificial layer from the second and third regions;
  depositing the second sacrificial layer in the first, second, and third regions;
  removing the second sacrificial layer from the third region; and
  depositing the third sacrificial layer in the first, second, and third regions.

3. The method of claim 1, wherein fabricating the interferometric modulators of the first, second, and third types further comprises removing the first, second, and third sacrificial layers after forming the first and second optical layers.

4. The method of claim 1, wherein the interferometric modulators of the first, second, and third types are formed in first, second, and third regions, respectively, and wherein fabricating the interferometric modulators of the first, second, and third types comprises in sequence:
  depositing the first sacrificial layer;
  depositing the second sacrificial layer over the first sacrificial layer;
  depositing the third sacrificial layer over the second sacrificial layer;
  removing the third sacrificial layer from the second and third regions; and
  removing the second sacrificial layer from the third region.

5. The method of claim 4, wherein fabricating the interferometric modulators of the first, second, and third types further comprises:
  providing a first etch stop layer between the first and second sacrificial layers; and
  providing a second etch stop layer between the second and third sacrificial layers.

6. The method of claim 5, wherein the first gap size is greater than the sum of the first, second, and third thicknesses by thicknesses of the first and second etch stop layers.

7. The method of claim 4, wherein removing the third sacrificial layer from the second and third regions comprises providing a first resist over the third sacrificial layer in the first region, and etching away the third sacrificial layer, using the first resist as a mask; and
  wherein removing the second sacrificial layer from the third region comprises providing a second resist over the second sacrificial layer in the second region, and etching away the second sacrificial layer using the first and second resists as masks.

8. The method of claim 1, wherein the interferometric modulator includes a support structure which is hidden from view.

9. The method of claim 1, wherein fabricating the interferometric modulators of the first, second, and third types further comprises providing one or more etch stops between the sacrificial layers.

10. The method of claim 1, wherein the interferometric modulators of the first, second, and third types are formed in first, second, and third regions, respectively, and wherein fabricating the interferometric modulators of the first, second, and third types comprises in sequence:
  depositing the first sacrificial layer;
  depositing the second sacrificial layer over the first sacrificial layer;
  depositing the third sacrificial layer over the second sacrificial layer;
  providing a photoresist over the third sacrificial layer;
  exposing the photoresist to light, using a grayscale mask;
  removing the photoresist from the third region;
  etching away the third sacrificial layer from the third region;
  removing the photoresist from the second region; and
  etching away the third sacrificial layer from the second region and the second sacrificial layer from the third region.

11. The method of claim 10, wherein the grayscale mask comprises a substantially zero transmission region overlying the first region, a moderate transmission region overlying the second region, and a highest transmission region overlying the third region, wherein the moderate transmission region has a higher transmittance than the substantially zero transmission region, and wherein the highest transmission region has a higher transmittance than the moderate transmission region.

12. The method of claim 10, wherein fabricating the interferometric modulators of the first, second, and third types further comprises:
  providing an etch stop layer between the first and second sacrificial layers; and
  providing an etch stop layer between the second and third sacrificial layers.

13. The method of claim 12, wherein the first, second and third sacrificial layers comprise a material etchable by $XeF_2$.

14. The method of claim 13, wherein the etch stop layers comprise a material etchable by $XeF_2$.

15. The method of claim 12, wherein the etch stop layers comprise a material etchable by $XeF_2$.

16. The method of claim 10, wherein the etching away of the third sacrificial layer and the second sacrificial layer comprises using dry etching.

17. The method of claim 10, wherein the etching away of the third sacrificial layer and the second sacrificial layer comprises using wet etching.

* * * * *

UNITED STATES PATENT AND TRADEMARK OFFICE
CERTIFICATE OF CORRECTION

PATENT NO. : 7,297,471 B1
APPLICATION NO. : 10/414594
DATED : November 20, 2007
INVENTOR(S) : Mark W. Miles It is certified that error appears in the above-identified patent and that said Letters Patent is hereby corrected as shown below:

On Column 1, line 21 (approx.), after "No" please insert --.--.

On Column 1, line 34 (approx.), below "cost." please insert --SUMMARY OF THE INVENTION One embodiment described herein provides for a method for manufacturing an array of interferometric modulators. The method comprises fabricating interferometric modulators of a first type characterized by the size of the gap between its first and second optical layers when in the undriven state; fabricating interferometric modulators of a second type characterized by the size of the gap between its first and second optical layers when in the undriven state; and fabricating interferometric modulators of a third type characterized by the size of the gap between its first and second optical layers when in the undriven state, wherein fabricating the interferometric modulators of the first, second, and third types comprises using a sequence of deposition and patterning steps.

In another embodiment, a method is provided for subtractive definition of a multilayer sacrificial stack which comprises two different materials.

In another embodiment, a method is provided for manufacturing an array of interferometric modulators defining multiple patterns using a single photolithographic step.--, as a new paragraphs.

Signed and Sealed this

Fifteenth Day of July, 2008

JON W. DUDAS
*Director of the United States Patent and Trademark Office*